(12) United States Patent
Maekawa et al.

(10) Patent No.: US 7,253,746 B2
(45) Date of Patent: Aug. 7, 2007

(54) VEHICLE-PRESENCE NOTIFYING APPARATUS AND VEHICLE-PRESENCE NOTIFYING METHOD

(75) Inventors: Masahiro Maekawa, Hyogo (JP); Chie Shigenaga, Hyogo (JP); Naoyuki Takaishi, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 182 days.

(21) Appl. No.: 11/061,887

(22) Filed: Feb. 22, 2005

(65) Prior Publication Data

US 2005/0200462 A1  Sep. 15, 2005

(30) Foreign Application Priority Data

Mar. 10, 2004 (JP) .............................. 2004-067954
Mar. 15, 2004 (JP) .............................. 2004-072479

(51) Int. Cl.
G08G 1/16 (2006.01)
(52) U.S. Cl. .................. 340/903; 340/384.1; 340/435; 340/436; 340/441; 340/500; 180/167; 180/169; 381/61; 381/86
(58) Field of Classification Search ................ 340/903, 340/435, 436, 437, 441, 442, 500, 384.1, 340/384.3, 384.4, 384.7; 180/167, 169; 381/71.4, 86, 61
See application file for complete search history.

(56) References Cited

U.S. PATENT DOCUMENTS

| | | | | |
|---|---|---|---|---|
| 4,070,645 A | * | 1/1978 | Oreluk ........................ | 340/436 |
| 5,012,222 A | * | 4/1991 | Gavrilis ...................... | 340/436 |
| 5,164,700 A | * | 11/1992 | Green et al. ................ | 340/437 |
| 5,371,802 A | * | 12/1994 | McDonald et al. ........ | 381/71.4 |
| 5,450,057 A | * | 9/1995 | Watanabe ................... | 340/435 |
| 5,635,903 A | * | 6/1997 | Koike et al. ................ | 340/441 |
| 6,356,185 B1 | * | 3/2002 | Plugge et al. ............. | 340/384.3 |
| 6,876,298 B2 | * | 4/2005 | Litkouhi et al. ............ | 340/435 |

FOREIGN PATENT DOCUMENTS

| | | |
|---|---|---|
| JP | A 06-040289 | 2/1994 |
| JP | U 06-068987 | 9/1994 |
| JP | U 07-030499 | 6/1995 |
| JP | A 07-182587 | 7/1995 |
| JP | U 07-036504 | 7/1995 |
| JP | A 07-209424 | 8/1995 |
| JP | A 07-322403 | 12/1995 |
| JP | A 08-011629 | 1/1996 |
| JP | A 08-180282 | 7/1996 |
| JP | U 3032371 | 10/1996 |

(Continued)

Primary Examiner—Davetta W. Goins
(74) Attorney, Agent, or Firm—Oliff & Berridge, PLC

(57) ABSTRACT

An apparatus for notifying presence of a vehicle to a periphery of the vehicle includes a control unit that controls an operating unit that operates to cause the vehicle to drive, generating an operation sound; a judging unit that judges whether it is necessary to notify the presence of the vehicle to the periphery of the vehicle; and a notifying unit that notifies, when the judging unit judges that it is necessary to notify the presence of the vehicle to the periphery of the vehicle, the presence of the vehicle to the periphery of the vehicle using the operation sound, by changing a content of a control by the control unit.

27 Claims, 15 Drawing Sheets

FOREIGN PATENT DOCUMENTS

| | | |
|---|---|---|
| JP | A 10-083187 | 3/1998 |
| JP | A 10-136501 | 5/1998 |
| JP | A 10-178704 | 6/1998 |
| JP | A 11-027810 | 1/1999 |
| JP | A 2000-010576 | 1/2000 |
| JP | B2 3287110 | 3/2002 |
| JP | U 3089180 | 7/2002 |
| JP | A 2002-233001 | 8/2002 |
| JP | A 2002-359904 | 12/2002 |
| JP | A 2003-212033 | 7/2003 |

* cited by examiner

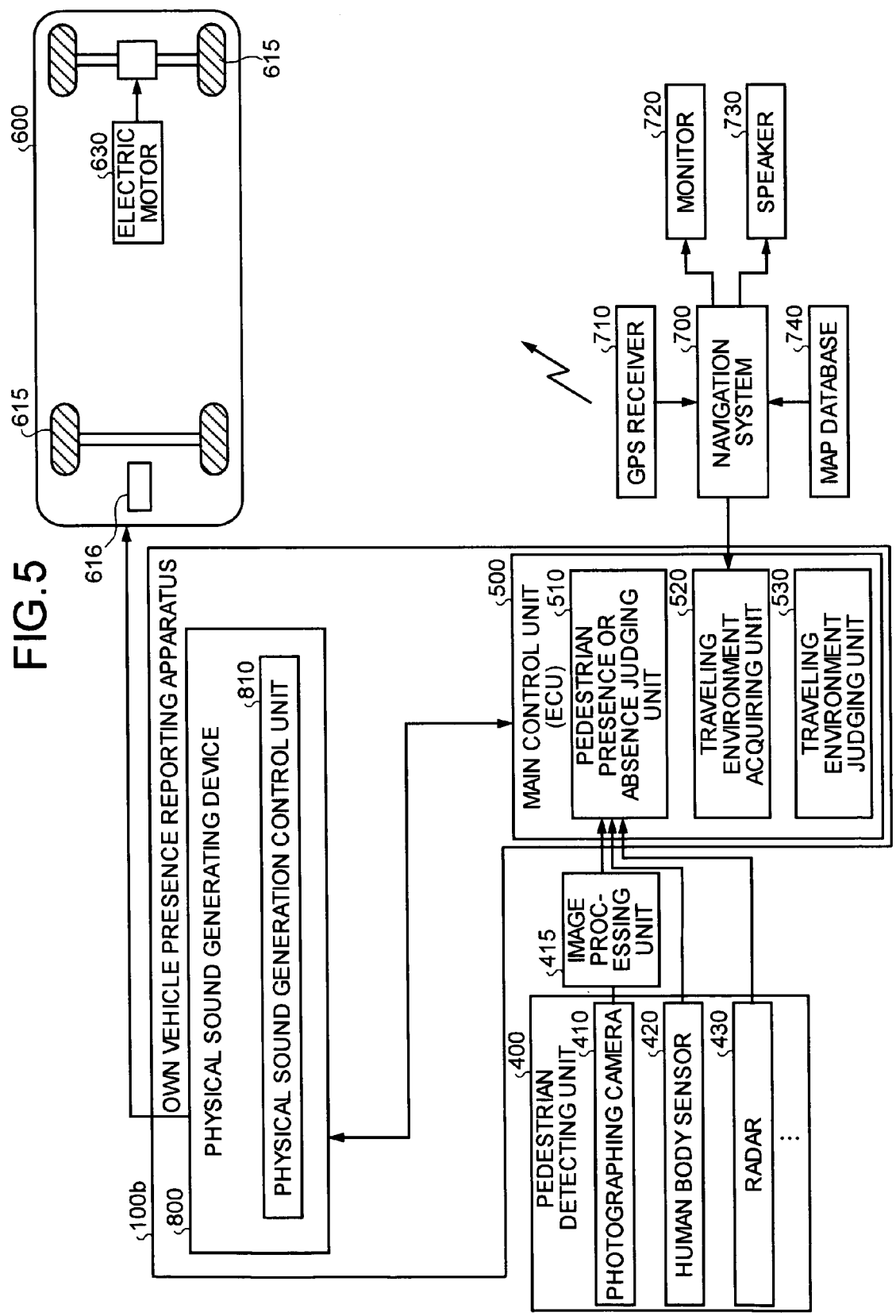

| SITUATION | DETECTION METHOD | PRI-ORITY | CLUS-TER | STATE | | | | | | | | |
|---|---|---|---|---|---|---|---|---|---|---|---|---|
| | | | | AB-SENT | PRE-SENT | PRE-SENT | PRE-SENT | PRE-SENT | PRE-SENT | PRE-SENT | PRE-SENT | PRE-SENT |
| HUMAN, BICYCLE | CAMERA, RADAR, HUMAN BODY SENSOR | 1 | OB-JECT | AB-SENT | PRE-SENT | PRE-SENT | PRE-SENT | PRE-SENT | PRE-SENT | PRE-SENT | PRE-SENT | PRE-SENT |
| TIME FRAME | NAVIGATION TIME INFORMATION, ETC. | 2 | ENVI-RON-MENT | — | NIGHT | NIGHT | DAY | DAY | DAY | DAY | DAY | DAY |
| BRIGHTNESS | ILLUMINANCE SENSOR | 3 | MEANS | — | DARK | BRIGHT | DARK | BRIGHT | BRIGHT | BRIGHT | BRIGHT | BRIGHT |
| SOUND OUTSIDE VEHICLE | MICROPHONE OUTSIDE VEHICLE | 4 | EFFECT | — | — | — | — | — | SMALL | SMALL | LARGE | LARGE |
| OTHER SOUNDS | CAMERA, VICS CONGESTION INFORMATION, ETC. | 4 | EFFECT | — | — | — | — | — | SMALL | LARGE | SMALL | LARGE |
| OWN VEHICLE PRESENCE REPORTING METHOD | | | | × | LIGHT | LIGHT+SOUND | LIGHT+SOUND | SOUND | × | × | × | × |

FIG.17

| SITUATION | DETECTION METHOD | PRIORITY | CLUSTER | STATE | | | | | | | |
|---|---|---|---|---|---|---|---|---|---|---|---|
| HUMAN, BICYCLE | CAMERA, RADAR, HUMAN BODY SENSOR | 1 | OBJECT | ABSENT | PRESENT | PRESENT | PRESENT | PRESENT | PRESENT | PRESENT | PRESENT |
| TIME FRAME | NAVIGATION TIME INFORMATION, ETC. | 2 | ENVIRONMENT | — | NIGHT | DAY | DAY | DAY | DAY | DAY | DAY |
| BRIGHTNESS | ILLUMINANCE SENSOR | 3 | MEANS | — | — | DARK | BRIGHT | BRIGHT | BRIGHT | BRIGHT | BRIGHT |
| SOUND OUTSIDE VEHICLE | MICROPHONE OUTSIDE VEHICLE | 4 | EFFECT | — | — | — | — | SMALL | SMALL | LARGE | LARGE |
| OTHER SOUNDS | CAMERA, VICS CONGESTION INFORMATION, ETC. | 4 | EFFECT | — | — | — | — | SMALL | LARGE | SMALL | LARGE |
| OWN VEHICLE PRESENCE REPORTING METHOD | | | | × | LIGHT | LIGHT | LIGHT | SOUND | × | × | × |

1880b

VEHICLE-PRESENCE NOTIFYING APPARATUS AND VEHICLE-PRESENCE NOTIFYING METHOD

BACKGROUND OF THE INVENTION

1) Field of the Invention

The present invention relates to a technology for notifying presence of a vehicle to a periphery of the vehicle appropriately.

2) Description of the Related Art

In recent years, in place of automobiles that use a gasoline engine (an internal combustion engine) as a power source, hybrid automobiles that include both a gasoline engine and an electric motor as power sources, fuel-cell-powered automobiles that travel while generating electric power with a fuel cell using a hydrogen gas as a fuel, electric automobiles that use a battery (an electric motor), which is charged by a charger, as a power source, and the like have started to be widely used.

An advantage in driving a vehicle with such an electric motor is that a traveling sound is small (a silence characteristic is high). However, a pedestrian or a bicycle rider may judge whether an automobile (a vehicle) is present around the pedestrian or the bicycle rider or assume a distance between the vehicle and the pedestrian or the bicycle rider according to an engine sound emitted from the vehicle.

Since the pedestrian or the bicycle rider makes his/her judgment based on a traveling sound of an engine driven vehicle, which has been generally used in the past, there is a problem in that the pedestrian or the bicycle rider may be slow in noticing presence of an electric motor driven vehicle (or a hybrid automobile or a fuel-cell-powered automobile) with a high silence characteristic or may make an error in assumption of a distance.

Usually, a pedestrian walking on a street or a bicycle rider can recognize approach or the like of an automobile (a vehicle) according to an engine sound or the like of the vehicle. However, in the case of the hybrid automobile, since the hybrid automobile is in a mode of traveling by an electric motor rather than traveling by an engine at the time of low-speed traveling, no engine sound is emitted, which causes a near collision or the like. Similarly, in the case of the electric automobile or the fuel-cell-powered automobile, the automobile is always in a mode of traveling by an electric motor. Thus, since a pedestrian cannot recognize approach of the electric automobile or the fuel-cell-powered automobile, which causes a near collision as in the case of the hybrid automobile.

Therefore, vehicle-presence notifying apparatuses for solving the problems caused by the silence characteristic provided in the hybrid automobiles, the fuel-cell-powered automobiles, the electric automobiles, and the like have been disclosed in patent documents.

Concerning this type of a conventional technique, for example, Japanese Patent Application Laid-open No. H11-27810 discloses a technique for an electric automobile that gives an alarm by voice using a speaker or the like to a pedestrian and a driver around its vehicle when the vehicle detects a human body (a pedestrian) with a photographing camera or a radar provided in the vehicle. Japanese Patent Application Laid-open No. H7-322403 discloses a technique for notifying a driving state of an electric automobile to a pedestrian or a driver with sound. Japanese Patent Application Laid-open No. H10-83187 discloses a technique for a hybrid automobile that emits different artificial sounds according to a driving mode at the time of traveling. Japanese Patent Application Laid-open No. H10-178704 discloses a technique for a hybrid automobile that reduces an engine sound When a road, on which a vehicle is traveling, is congested.

However, vehicle-presence notifying apparatuses according to the conventional techniques have problems as described below. In the case of the conventional technique disclosed in the Japanese Patent Application Laid-open No. H11-27810, it is necessary to provide a sound source for the speaker or the like anew in the electric automobile, which causes an increase in cost. In the case of the conventional techniques disclosed in Japanese Patent Application Laid-open No. H7-322403 and Japanese Patent Application Laid-open No. H10-83187, an artificial sound for notifying a driving state of the vehicle to a pedestrian or a driver is simply emitted or an artificial sound is emitted according to a driving mode, which only prevents a silence characteristic originally provided in the hybrid automobile and the fuel-cell-powered automobile. In addition, in the case of such conventional techniques, it is possible to notify approach of a vehicle to a pedestrian with an artificial sound or the like emitted from the speaker. However, in the notifying by such an artificial sound, since a pedestrian not in a traveling direction of the vehicle can also hear an alarm sound, the technologies are contrary to the silence characteristic originally provided in the hybrid automobile and the fuel-cell-powered automobile. In residential areas in the suburbs rather than a city where there is heavy traffic of pedestrians, noise caused by automobiles is a problem. Thus, notifying by an alarm sound using the speaker or the like is not so preferable in terms of the environment.

SUMMARY OF THE INVENTION

It is an object of the present invention to solve at least the above problems in the conventional technology.

An apparatus according to one aspect of the present invention, which is for notifying presence of a vehicle to a periphery of the vehicle, includes a control unit that controls an operating unit that operates to cause the vehicle to drive, generating an operation sound; a judging unit that judges whether it is necessary to notify the presence of the vehicle to the periphery of the vehicle; and a notifying unit that notifies, when the judging unit judges that it is necessary to notify the presence of the vehicle to the periphery of the vehicle, the presence of the vehicle to the periphery of the vehicle using the operation sound, by changing a content of a control by the control unit.

An apparatus according to another aspect of the present invention, which is for notifying presence of a vehicle to a periphery of the vehicle, includes a physical sound generating unit that generates a physical sound by driving of the vehicle; a judging unit that judges whether it is necessary to notify the presence of the vehicle to the periphery of the vehicle; and a notifying unit that notifies, when the judging unit judges that it is necessary to notify the presence of the vehicle to the periphery of the vehicle, the presence of the vehicle to the periphery of the vehicle, by causing the physical sound generating unit to generate the physical sound.

An apparatus according to still another aspect of the present invention, which is for notifying presence of a vehicle to a periphery of the vehicle, includes a traveling-environment judging unit that judges a traveling environment of the vehicle; a plurality of notifying units having different notifying mechanisms; and a selecting unit that selects a combination of the notifying units based on the traveling environment judged. The vehicle-presence notifying apparatus controls the notifying units based on the combination selected.

A method according to still another aspect of the present invention, which is for notifying presence of a vehicle to a periphery of the vehicle, includes judging a traveling environment of the vehicle; selecting a combination of notifying units having different notifying mechanisms based on the traveling environment judged; and controlling the notifying units based on the combination selected.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a schematic diagram of a vehicle-presence notifying apparatus according to a third embodiment of the present invention;

FIG. 15 is an alarm-type managing table according to the vehicle-presence notifying method with a city set as a traveling zone object;

FIG. 17 is an alarm-type managing table according to the vehicle-presence notifying method with a suburb (a residential area) set as a traveling zone object.

DETAILED DESCRIPTION

Exemplary embodiments according to the present invention will be explained in detail with reference to the accompanying drawings. In a first embodiment of the present invention, an outline and characteristics of the vehicle-presence notifying apparatus according to the present invention will be explained and, then, structures of vehicle-presence notifying apparatuses, which are applied to a hybrid automobile, a fuel-cell-powered automobile, and an electric automobile, and control procedures for notifying to a pedestrian with a vehicle presence sound according to the vehicle-presence notifying method will be explained. The present invention is not limited by first to third embodiments to be described below.

Figure 1:
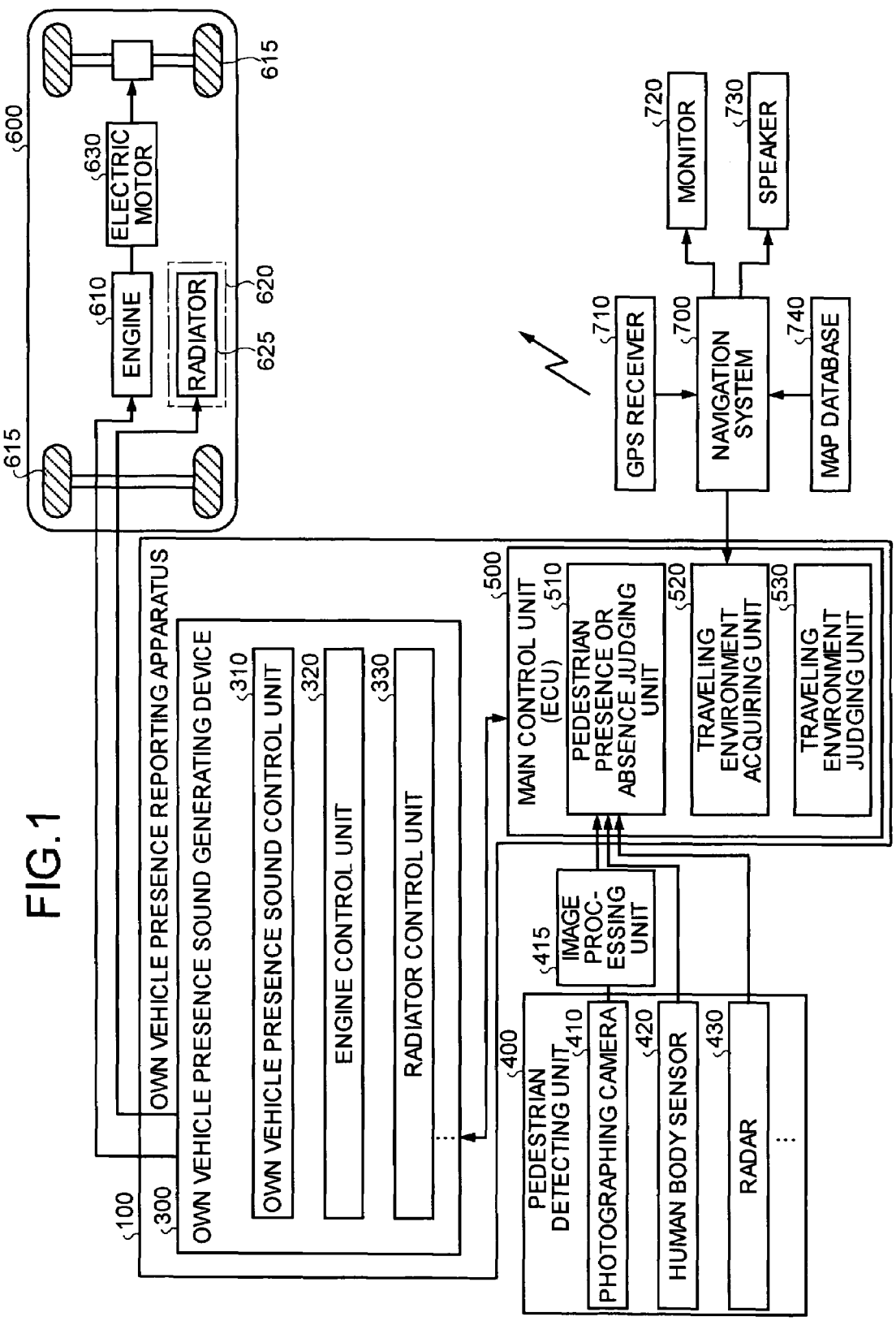
FIG. 1 is a schematic diagram of a vehicle-presence notifying apparatus according to a first embodiment of the present invention.

FIG. 1 is a schematic diagram of a structure of a vehicle-presence notifying apparatus that is applied to a hybrid automobile according to the first embodiment.

Main characteristics of the vehicle-presence notifying apparatus are as explained below. A vehicle-presence notifying apparatus 100 includes a vehicle-presence-sound generating unit 300, a pedestrian detecting unit 400, and a main control unit 500. The vehicle-presence notifying apparatus 100 has a function of, when a pedestrian or a bicycle rider is detected by the pedestrian detecting unit 400, giving an alarm to the pedestrian or the bicycle rider with an engine sound or the like using the vehicle-presence-sound generating unit 300 according to drive by an engine 610. Consequently, the vehicle-presence notifying apparatus makes it possible to notify presence of its vehicle to the pedestrian or the bicycle rider surely utilizing an existing function (an engine sound emitted by the engine 610) provided in the hybrid automobile while maintaining a silence function originally provided in the hybrid automobile and, in addition, prevent an accident like collision with the vehicle surely.

In the example of the conventional technique described above, the vehicle-presence notifying apparatus notifies presence of its vehicle to a pedestrian by emitting an artificial sound or the like from a speaker when the vehicle-presence notifying apparatus detects the pedestrian (a human body) approaching the vehicle. On the other hand, in the present invention, the vehicle-presence notifying apparatus 100 calls attention of a pedestrian approaching its vehicle 600 utilizing an engine sound generated according to drive by the engine 610 provided in the vehicle 600. More specifically, in the case of the hybrid automobile, drive by the engine 610 is started when a pedestrian is detected to give an alarm to the pedestrian with this engine sound. At the time when the vehicle 600 is started, to inform a pedestrian of the start, the vehicle-presence notifying apparatus 100 performs control for generating an engine sound using the engine 610. In the case of the fuel-cell-powered automobile, the vehicle-presence notifying apparatus starts actuation of an air compressor 250 (FIG. 4) to given an alarm to a pedestrian with a compressor sound of the air compressor 250.

The vehicle-presence notifying apparatus according to the present invention also has the following characteristics in relation to the main characteristics described above. According to the present invention, other than the alarm utilizing a special sound generating function by the engine 610 and the air compressor 250 provided in the vehicle in advance, the vehicle-presence notifying apparatus includes a physical-sound generating unit 800 (FIG. 6A) that can generate a physical special sound according to traveling of the vehicle when a pedestrian is detected. More specifically, as the physical-sound generating unit 800, the vehicle-presence notifying apparatus includes a movable tire 616 for generating a road noise that is a noise generated when the movable tire 616 comes into contact with a road surface M at the time of traveling of a vehicle. Consequently, the vehicle-presence notifying apparatus notifies approach of its vehicle to a pedestrian with the road noise generated by the contact between the movable tire 616 and the road surface M.

The vehicle-presence notifying apparatus according to the present invention acquires a traveling environment (e.g., a traveling area) of its vehicle in relation to the above description and, when the traveling environment in which the vehicle is traveling is, for example, a city, notifies presence of the vehicle to a pedestrian. More specifically, the vehicle-presence notifying apparatus searches a traveling environment of the vehicle based on map information using a location searching unit like a navigation system 700 and judges the acquired traveling environment. In addition, when the vehicle is traveling in areas other than a city, the vehicle-presence notifying apparatus cancels (stops) notifying by sound using the vehicle-presence-sound generating unit 300 and the physical-sound generating unit 800. Consequently, the vehicle-presence notifying apparatus does not give an alarm by an unnecessary sound in areas other than an area where traffic of pedestrians concentrates like a city to make it possible to maintain a silence action provided in the hybrid automobile and the fuel-cell-powered automobile and improve a noise preventing measure. Note that, as the traveling environment, not only the traveling area of the vehicle but also a traveling time frame and a sound volume outside a vehicle may be acquired.

The vehicle notifying apparatus 100 has a function of, when a pedestrian or a bicycle rider is detected by the pedestrian detecting unit 400, notifying presence of its vehicle to the pedestrian or the bicycle rider with an engine sound or the like generated according to drive by an engine 610 as an alarm sound using the vehicle-presence-sound generating unit 300. Consequently, the vehicle-presence notifying apparatus makes it possible to notify presence of its vehicle to the pedestrian or the bicycle rider surely while maintaining a silence function originally provided in the hybrid automobile without generating an artificial sound from a speaker or the like. In addition, the vehicle-presence notifying apparatus can prevent a fatal accident like collision between the vehicle and a pedestrian.

The hybrid automobile (the vehicle 600) includes two kinds of power sources, namely, an engine 610 and an electric motor 630. The hybrid automobile is characterized in that the hybrid automobile is driven by a drive force of the electric motor 630 at the start time and driven by the engine 610 at the time of low speed traveling. The hybrid automobile uses regenerative braking, which is performed by the electric motor 630 at the time of braking or hill descending, or the engine 610 as a so-called "generator". According to the first embodiment, the hybrid automobile is further characterized by controlling engine drive control timing by the engine 610 serving as one power source of the hybrid automobile to thereby use an engine sound generated by the engine 610 as an alarm sound for notifying presence of the vehicle to a pedestrian walking in a city and a bicycle rider.

The vehicle-presence notifying apparatus 100 includes the vehicle-presence-sound generating unit 300, the pedestrian detecting unit 400, and the main control unit 500. As main components closely related to the present invention, the vehicle 600 (the hybrid automobile) includes the engine 610, a radiator 625 constituting a cooling unit 620, and the electric motor 630 that is disposed in series with the engine 610. According to the first embodiment, drive sounds emitted by the engine 610 and the cooling unit 620 (the radiator 625) (an engine sound and a sound emitted by a radiator fan) as alarm sounds.

The vehicle-presence-sound generating unit 300 includes a vehicle presence sound control unit 310, an engine control unit 320, and a radiator control unit 330. The automobile presence sound generating unit 300 has a function of, when a pedestrian or a bicycle rider is detected by the pedestrian detecting unit 400, driving the engine 620 and the cooling unit 620 (the radiator 625) to generate an engine sound and a sound by the radiator fan 622 (FIG. 2).

The engine control unit 320 has a function of controlling drive start timing of the engine 610 mounted on the vehicle 600. The radiator control unit 330 has a function of controlling drive start timing of the radiator 625 (the radiator fan 622) provided in the cooling unit 620 mounted on the vehicle 600.

The vehicle presence sound control unit 310 has a control function of causing both the engine control unit 320 and the radiator control unit 330 to give an instruction for notifying presence of the vehicle 600 to the engine 610 and the cooling unit 620 (the radiator 625) at predetermined control timing (an engine sound and a sound by the radiator fan 622).

Figure 2:
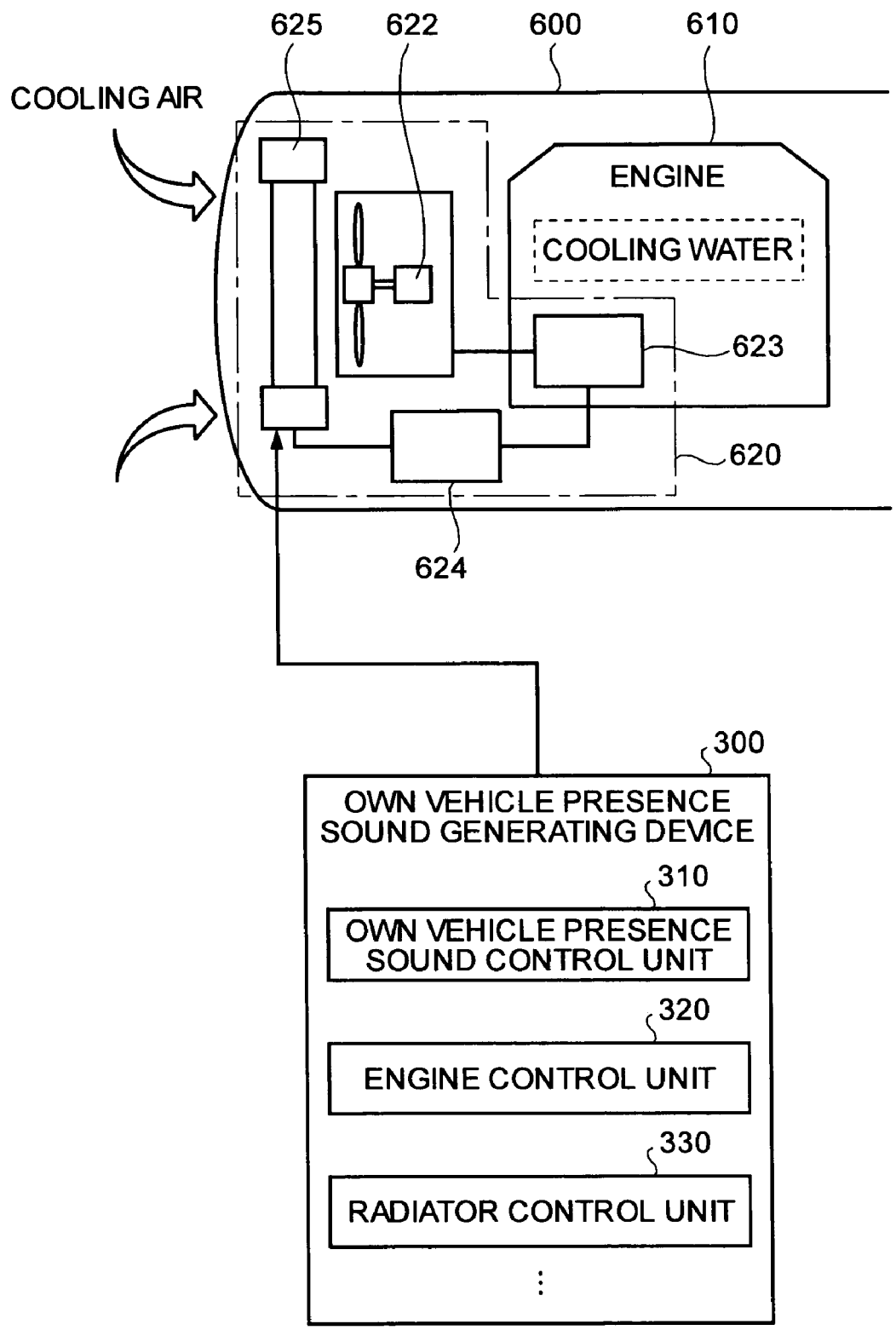
FIG. 2 is a block diagram of an internal structure of a cooling unit (a radiator)

FIG. 2 is a block diagram of a main part constituting the cooling unit 620 (the radiator 625) for preventing overheat. The cooling unit 620 includes the radiator 625, a cooling fan 622, a water pump 623, and a thermostat 624 that control temperature of cooling water circulating a cooling path (a bypass line). The water pump 623 has a function of rotating the cooling fan 622 to replace warmed cooling water in the engine 610 with cooling water cooled by a radiator core of the radiator 625. The radiator 625 includes an upper tank that receives the cooling water and a lower tank that stores the cooled cooling water when the radiator 625 radiates heat. The cooling water warmed according to cooling of the engine 610 is guided to the upper tank, cooled by the radiator core, and returned to the engine 610 from the lower tank. In this embodiment, rotation drive timing of the cooling fan 622 is controlled by the radiator control unit 330 of the vehicle-presence-sound generating unit 300, and a rotation sound of the cooling fan 622 is changed to an alarm sound for a pedestrian by the vehicle presence sound control unit 310.

According to the first embodiment, the cooling fan 622 for cooling the radiator 625 is used and driven at the time when a pedestrian is detected, whereby an alarm sound is generated. However, other than the alarm sound generated by the radiator 625, it is also possible to use, for example, an operation sound, which is emitted by a cooling fan for cooling a reactor provided in a power control unit or the like of the vehicle or a cooling fan for cooling a battery provided in the electric automobile, as an operation sound for generating an alarm as in the cooling fan 622 for the radiator 625.

Referring back to FIG. 1, the respective components of the vehicle-presence notifying apparatus 100 will be explained again. The pedestrian detecting unit 400 has a function of detecting a pedestrian (a human body) or a bicycle rider who is present around the vehicle 600 or approaches the vehicle 600. The pedestrian detecting unit 400 includes a photographing camera 410, a human-body sensor 420, a radar 430, and the like. An image processing unit 415 has a function of converting analog information (video information) obtained by the photographing camera 410 into digital information. Note that it is possible to adopt, for example, a pyroelectric infrared-ray sensor with a wide wavelength region, which can detect an infrared ray emitted from a pedestrian (a human body), as the human-body sensor 410.

The main control unit 500 has a function of collectively controlling respective sections of the entire vehicle-presence notifying apparatus 100. The main control unit 500 includes a pedestrian-presence judging unit 510, a traveling-environment acquiring unit 520, and a traveling-environment judging unit 530. The pedestrian-presence judging unit 510 has a function of detecting a pedestrian (a human body) or a bicycle rider, who is present around the vehicle 600 or approaches the vehicle 600, based on a "pedestrian detection signal" sent from the photographing camera 410, the human-body sensor 420, or the radar 430. The traveling-environment acquiring unit 520 has a function of acquiring a traveling environment in which the vehicle 600 is traveling. Here, the traveling environment acquired by the traveling-environment acquiring unit 520 indicates a traveling area (a city or a suburb) in which the vehicle 600 is traveling, a sound outside the vehicle, brightness outside the vehicle, a traveling time frame, congestion, and the like. The traveling-environment judging unit 530 has a function of judging the traveling environment of the vehicle 600 acquired by the traveling-environment acquiring unit 520 as a traveling environment acquired by a navigation system 700.

The navigation system 700 is connected with a global positioning system (GPS) receiver 710 that calculates a present location of the vehicle 600 according to communication with a GPS satellite, a monitor 720, and a speaker 730. The navigation system 700 has a function of managing a planned route (a planned traveling route) and a present traveling environment of the vehicle 600. In particular, in this embodiment, using the navigation system 700, the traveling-zone judging unit 530 judges whether a traveling area of the vehicle 600 is a city according to a present location of the vehicle 600 calculated by the GPS receiver 710.

Figure 3:
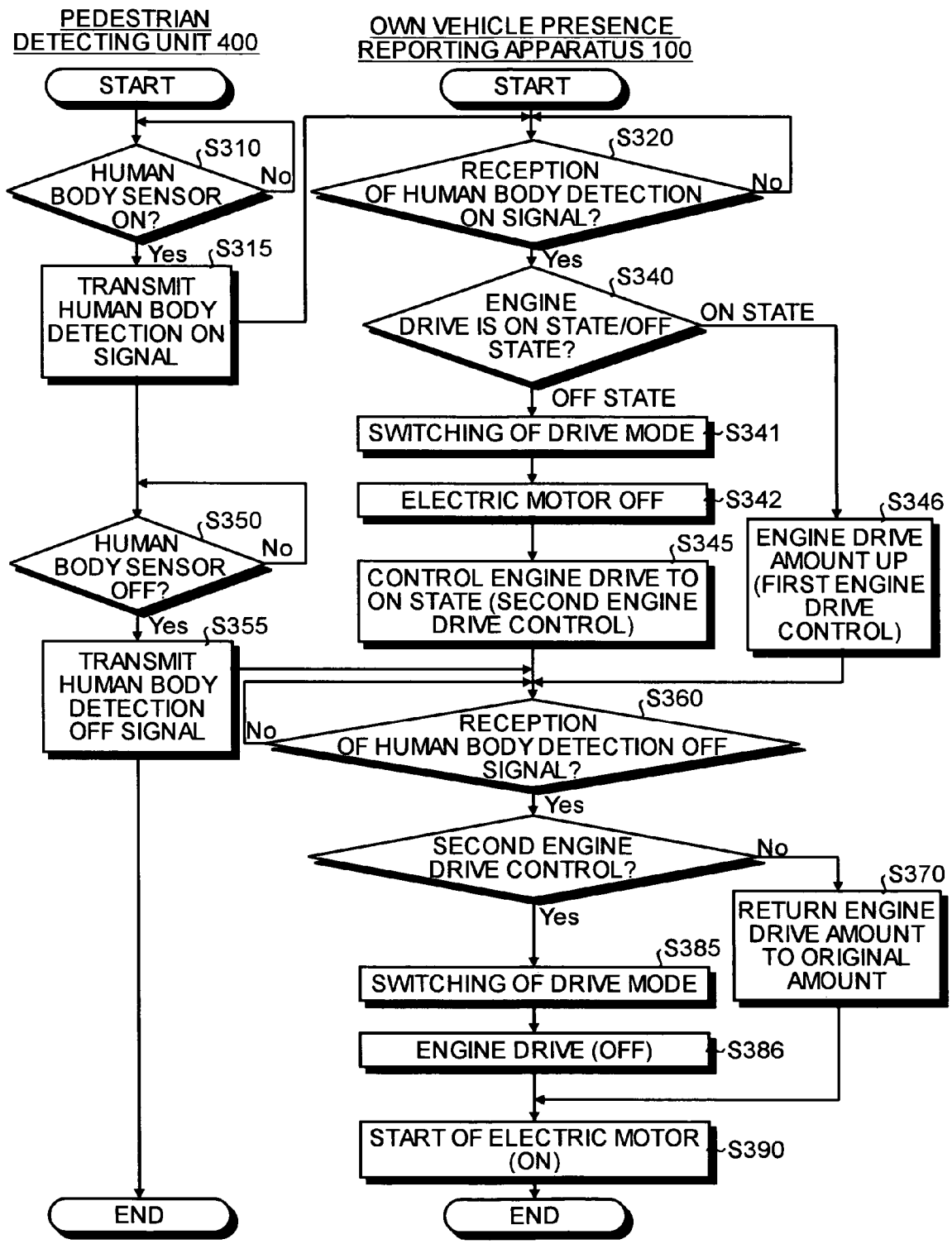
FIG. 3 is a flowchart of basic control procedures of a vehicle-presence notifying method.

FIG. 3 is a flowchart explaining details of a vehicle-presence notifying method performed by the vehicle-presence notifying apparatus according to the first embodiment. In this flowchart, detailed control procedures to be performed by the vehicle-presence notifying apparatus 100 are explained.

First, when the human-body sensor 140 (FIG. 1) detects presence of a pedestrian, a bicycle rider, or the like around the vehicle 600 or approach of a pedestrian, a bicycle rider, or the like to the vehicle 600 (ON) (step S310), the human-body sensor 140 transmits a "human body detection ON signal" to the main control unit 500 of the vehicle-presence notifying apparatus 100 (step S315). On the other hand, when the main control unit 500 receives the "human body detection ON signal" transmitted from the human body detection sensor 410 (step S320), the main control unit 500 judges whether drive by the engine 610 is ON or OFF (step S340). Note that the judgment on a traveling environment of the vehicle 600 by the traveling-environment judging unit 530 is performed using the navigation system 700.

If the drive by the engine 610 is ON as a result of the judgment at step S340 (Yes at step S340), the main control nit 500 performs control for increasing a drive level of the engine 610 (first engine drive control) (step S346). By increasing the drive level of the engine 610 according to the processing at step S346, an engine sound emitted by the engine 610 changes to an increased engine sound, which acts as an alarm sound for a pedestrian.

On the other hand, if the drive by the engine 610 is OFF as a result of the judgment at step S340 (No at step S340), the main control unit 500 switches a driving mode (step S341), turns OFF the electric motor 630 (step S342), and performs control processing for switching the drive by the engine 610 from OFF to ON (second engine drive control) (step S345). By switching the drive by the engine 610 from OFF to ON in this way, the engine 610 emits an engine sound, which changes to an alarm sound for a pedestrian. Note that, in this embodiment, the "city" is explained as an example of the traveling environment to be acquired by the traveling-environment acquiring unit 520. However, as described above, a sound outside the vehicle, brightness outside the vehicle, a traveling time frame, congestion, or the like may be acquired as a traveling environment to notify presence of the vehicle 600 to a pedestrian according to the acquired traveling environment.

When an output of the human-body sensor 410 is turned OFF, the pedestrian detecting unit 400 transmits a human-body-detection OFF signal". More specifically, if it is judged at step S350 that no pedestrian is present around the vehicle 600 (Yes at step S350), the pedestrian detecting unit 400 transmits a human-body-detection OFF signal". When the main control unit 500 of the vehicle-presence notifying apparatus 100 receives the human-body-detection OFF signal (step S360), the main control unit 500 judges whether drive control for the engine 610 is the first engine drive control or the second engine drive control (step S365). If the drive control for the engine 610 is the second engine drive control (Yes at step S365), the main control unit 500 shifts to processing for switching a driving mode (step S385) and switches drive by the engine 610 from ON to OFF (step S386). Then, traveling of the hybrid automobile changes to a mode of traveling according to the drive by the electric motor 630 (step S390), and the entire processing ends (END).

If the drive control for the engine 610 is not the second engine drive control as a result of the judgment at step S365 (No at step S365), the main control unit 500 shifts to step S370 and performs control for returning an amount of drive by the engine 610 to an original amount (step S370), and the entire processing ends (END).

By performing the series of processing, when the vehicle 600 detects a pedestrian, it is possible to notify presence of the vehicle 600 to the pedestrian with an engine sound to secure safety for the pedestrian.

Note that, when it is judged by the traveling-environment judging unit 510 (FIG. 1) that the traveling environment of the vehicle 600 is a city, the main control unit 500 also judges whether drive by the engine 610 is ON or OFF (step S340). If the drive by the engine 610 is OFF (No at step S340), the main control unit 500 performs the control processing for switching the drive by the engine 610 from OFF to ON.

When the vehicle-presence notifying apparatus 100 judges that the vehicle 600 has reached a city in association with the navigation system 700, the main control unit 500 may perform control for switching the drive by the engine 610 to the drive by the electric motor 630 (a battery) to reduce residual battery power. This is because an alarm is given according to the drive by the engine 610 while the vehicle 610 is traveling in a city and, as described above, the drive source (the battery) for driving the electric motor 630 is charged according to the drive by the engine 610. Consequently, since the charging is performed efficiently, it is possible to prevent energy from being abandoned because of overcharging as much as possible.

At the time of normal traveling, when residual battery power decreases to be lower than a predetermined threshold value (Th1), the drive by the electric motor 630 is switched to the drive by the engine 610. According to the present invention, when it is judged by the navigation system 700 that the vehicle is approaching a city, it is possible to continue the drive by the electric motor 630 until the residual battery power falls below a threshold value (Th2), where Th1>Th2. This is because, when the vehicle travels in a city, an alarm is given to a pedestrian according to the drive by the engine 610 and, as described above, the drive source (the battery) for driving the electric motor 630 is charged according to the drive by the engine 610. In this case, since the charging is performed efficiently, it is possible to prevent energy from being abandoned because of overcharging as much as possible.

As explained above, according to the first embodiment, when a pedestrian or the like is detected, the vehicle-presence notifying apparatus notifies presence of the vehicle to the pedestrian or the like with an engine sound, which is emitted based on drive by the engine according to the engine control unit 310 of the vehicle-presence-sound generating unit 300, as an alarm sound. Thus, it is possible to notify the presence of the vehicle to the pedestrian or the like surely by using the existing equipment originally provided in the hybrid automobile or the like such as the engine or the compressor.

Figure 4:
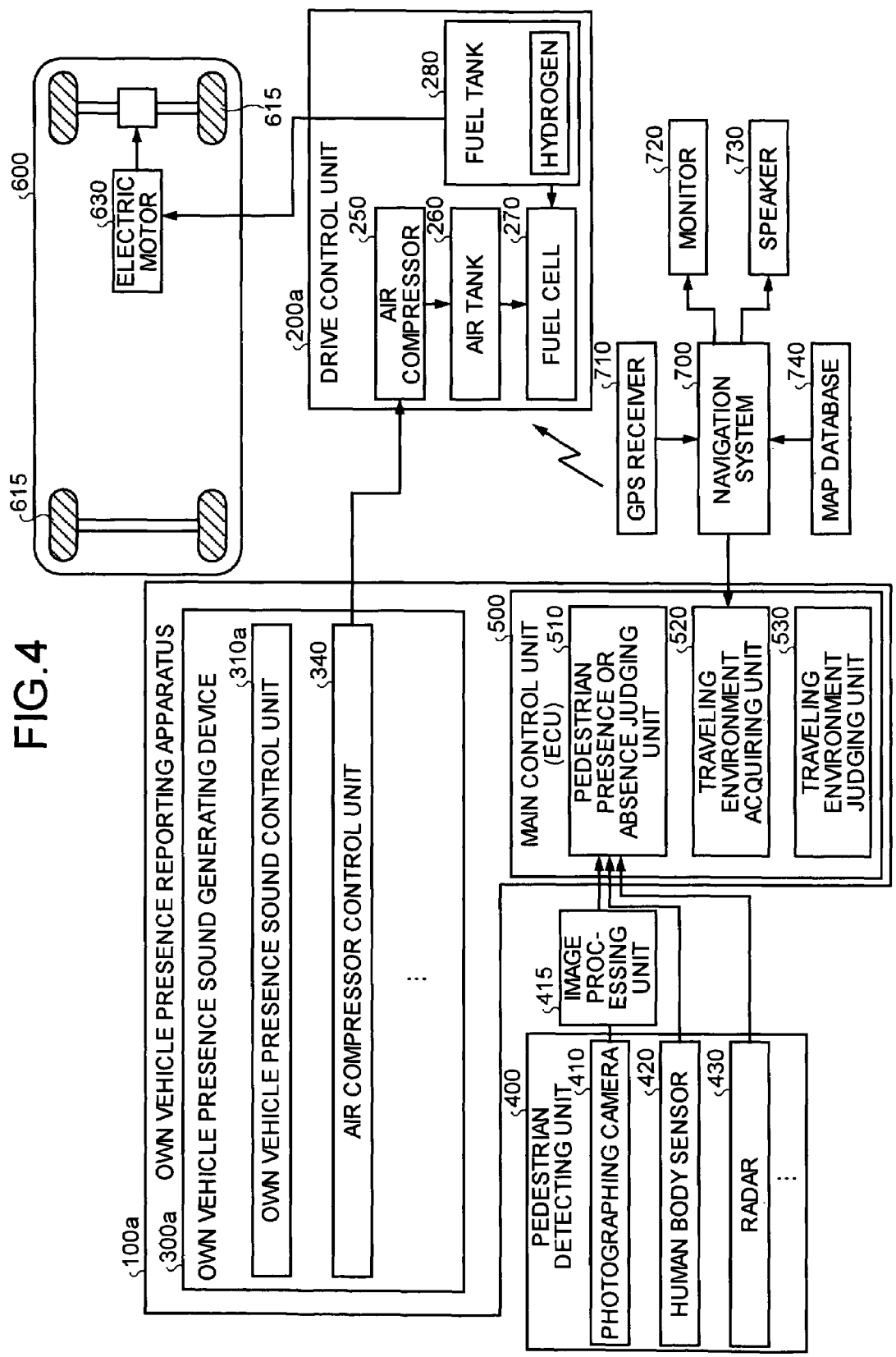
FIG. 4 is a schematic diagram of a vehicle-presence notifying apparatus according to a second embodiment of the present invention.

FIG. 4 is a schematic diagram of a vehicle-presence notifying apparatus according to a second embodiment of the present invention. The system diagram is an overall block diagram in which the vehicle-presence notifying apparatus of the present invention is applied to a fuel-cell-powered automobile. Note that, in FIG. 4, detailed explanations of components identical with those in FIG. 1 are omitted.

As shown in the figure, a vehicle-presence notifying apparatus 100a includes a drive control unit 200a, a vehicle-presence-sound generating unit 300a, the pedestrian detecting unit 400, and the main control unit 500. The vehicle-presence notifying apparatus 100a has a function of, when a pedestrian or a bicycle rider is detected by the pedestrian detecting unit 400, notifying presence of its vehicle to the pedestrian or the bicycle rider with a drive sound generated by the air compressor 250 as an alarm sound using the vehicle-presence-sound generating unit 300a. Consequently, the vehicle-presence notifying apparatus makes it possible to notify presence of the vehicle to the pedestrian or the bicycle rider surely while maintaining a necessary minimum silence function originally provided in the fuel-cell-powered automobile and, in addition, to prevent an accident like collision with the vehicle surely.

The fuel-cell-powered automobile is an electric automobile that travels while generating power with a fuel cell and is not equipped with an engine. Thus, the fuel-cell-powered automobile has a characteristic that the fuel-cell-powered automobile is excellent in a silence characteristic and supplies a hydrogen gas, which is equivalent to gasoline for the gasoline automobile, as a fuel. The fuel-cell-powered automobile is different form the electric automobile in that it is unnecessary to charge a battery.

More specifically, as shown in FIG. 4, drive of a wheel 660 is performed according to drive by the electric motor 630. The drive control unit 200a, which controls the drive by the electric motor 630, includes the air compressor 250, an air tank 260, a fuel cell 270, and a fuel tank 280 for storing a hydrogen gas. The fuel cell 270 has a function of generating electric power according to mixture (chemical reaction) of the hydrogen gas and oxygen in the air. An air compressor control unit 340 has a function of controlling drive of the air compressor 250.

The air compressor 250 has a function of feeding the air into the fuel cell 270. The air tank 260 can store the air fed into the fuel cell 270. According to the second embodiment, when the air compressor 250 feeds the air into the fuel cell 270, an air pump (not shown) of the air compressor 250 gives a drive sound emitted by the air compressor 250 to a pedestrian as an alarm sound.

As described above, according to the second embodiment, when a pedestrian or a bicycle rider is detected by the pedestrian detecting unit 400, it is possible to notify presence of its vehicle to the pedestrian or the bicycle rider with a drive sound emitted by the air compressor 250 as an alarm sound using the vehicle-presence-sound generating unit 300a. Thus, it is possible to improve safety for the pedestrian or the bicycle rider surely while maintaining a silence characteristic originally provided in the fuel-cell-powered automobile or the like.

Note that, as a sound generated by using the existing functions provided in the vehicle 600, other than the engine sound emitted by the engine and the air compressor sound according to the first and the second embodiments, it is possible to use, for example, a compressing sound generated by compressing the air with an air compressor of a brake provided in a braking unit.

FIG. 5 is a schematic diagram of a vehicle-presence notifying apparatus according to a third embodiment of the present invention. The system diagram is an overall block diagram in which the vehicle-presence notifying apparatus of the present invention is applied to an electric automobile. Note that, in FIG. 5, detailed explanations of components identical with those in FIGS. 1 and 4 are omitted.

As shown in the figure, a vehicle-presence notifying apparatus 100b includes the physical-sound generating unit 800, the pedestrian detecting unit 400, and the main control unit 500. The vehicle-presence notifying apparatus 100b is characterized in that, when a pedestrian or a bicycle rider is detected by the pedestrian detecting unit 400, notifying presence of its vehicle to the pedestrian walking in a city or the bicycle rider with a physical sound generated by the physical-sound generating unit 800 as an alarm sound. Consequently, the vehicle-presence notifying apparatus 100b makes it possible to notify the presence of the vehicle to the pedestrian or the bicycle rider surely while maintaining a silence function originally provided in the-electric automobile. In addition, the vehicle-presence notifying apparatus 100b can prevent a fatal accident like collision with the vehicle.

According to the third embodiment, in the electric automobile, the vehicle-presence notifying apparatus 100b is characterized by including the physical-sound generating unit 800, which can generate a physical sound, and controlling timing for generating a special sound from the physical-sound generating unit 800 to thereby give an alarm to a pedestrian walking in a city and a bicycle rider.

Figure 6A:
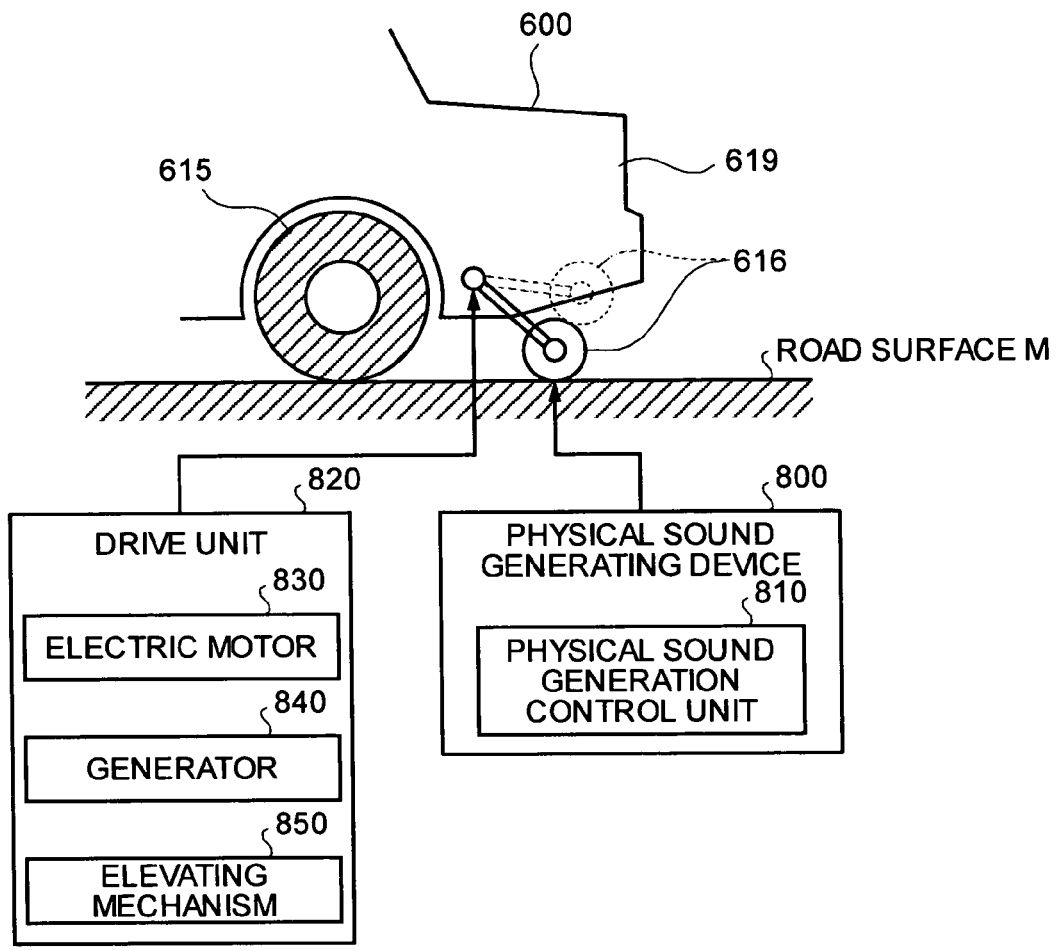
FIG. 6A is an explanatory diagram of a structure of a physical-sound generating unit.
Figure 6B:
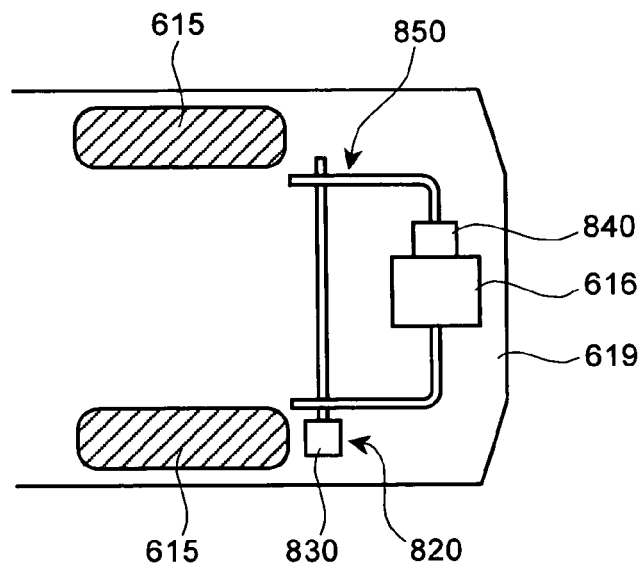
FIG. 6B is a top view of the physical-sound generating unit shown in FIG. 6A

FIGS. 6A and 6B are diagrams of a first example of the physical-sound generating unit 800 according to the third embodiment.

The physical-sound generating unit 800 shown in FIGS. 6A and 6B is characterized by including the movable tire 616 for generating a road noise (a physical sound generated by contact between the movable tire 616 and the road surface M) independently separate from four tires 615 for traveling provided in the vehicle 600. As shown in the figures, the physical-sound generating unit 800 includes the movable tire 616 and a physical sound generation control unit 810. A drive unit 820 includes an electric motor 830, a generator 840 having a regenerative power generating function. The electric motor 830 has a function of actuating an elevating mechanism 850. The generator 840 and the movable tire 616 are fixed substantially in the center of a crank rod formed in a C shape that is coupled to both ends of a drive transmission rod of the electric motor 830. Note that, usually, the movable tire 616 is housed inside a bumper 619 (a position of a chain line in FIG. 6A) in the rear part of the vehicle 600. In this example, heat generated by the contact between the movable tire 616 and the road surface M is collected in the regenerative generator 840.

In the physical-sound generating unit 800 constituted as described above, when it is judged by the pedestrian detecting unit 400 that a pedestrian is present around the vehicle 600, the elevating mechanism 850 is actuated according to drive by the electric motor 830, and the movable tire 616 housed in the bumper 619 starts to descend (a position of a solid line in FIG. 6A) to come into contact with the road surface M. When the vehicle 600 is traveling, it is possible to give a road noise, which is generated by the contact between the movable tire 616 and the road surface M, to the pedestrian as an alarm.

To generate a larger sound when the movable tire 616 is in contact with the road surface M, plural grooves (not shown) may be formed on the surface of the movable tire 616. In this case, control for generating a larger road noise by reducing an air pressure of the tires 615 may be used as well. Moreover, in this example, the movable tire 616 is brought into contact with the road surface M to generate a physical sound. However, it is also possible that a chain or the like is simply constituted to rise and fall freely instead of using the movable tire and, when a pedestrian is detected, the chain is brought into contact with the road surface M to emit a physical sound to the pedestrian.

Figure 7A:
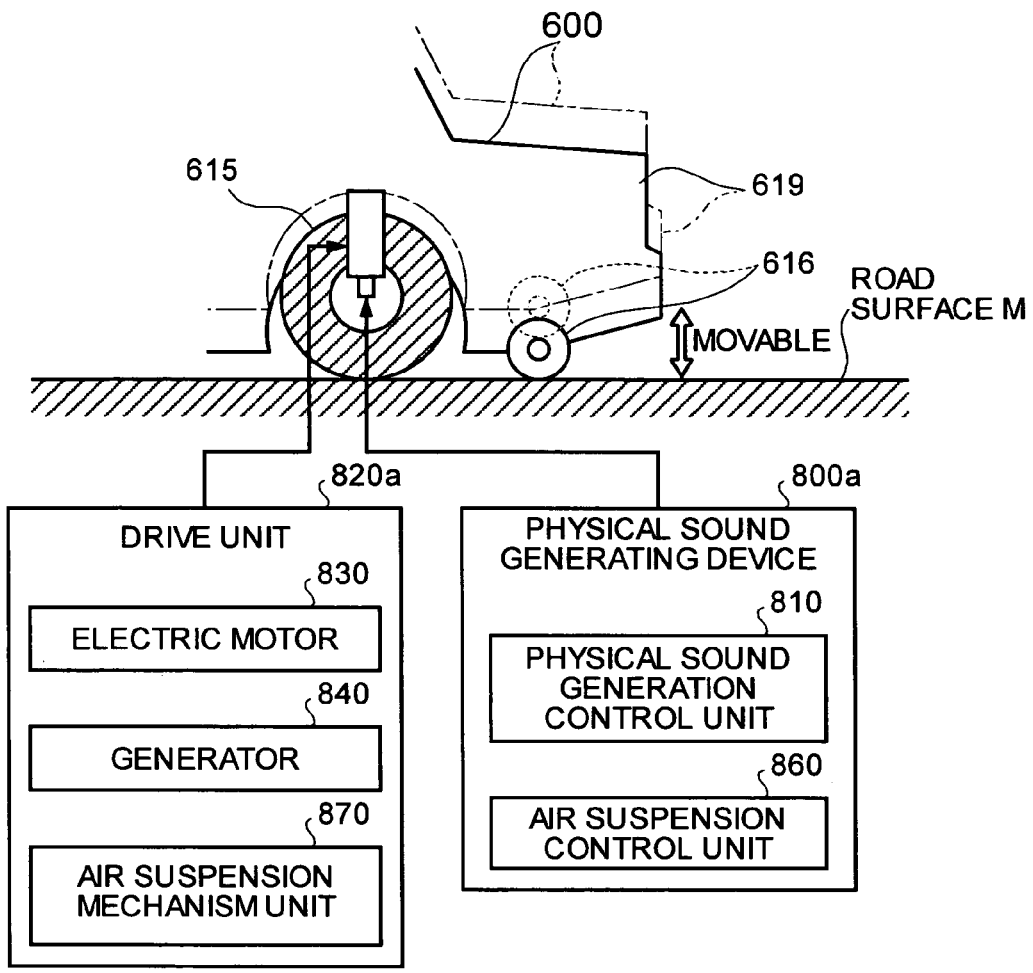
FIG. 7A is an explanatory diagram of a structure of the physical-sound generating unit.
Figure 7B:
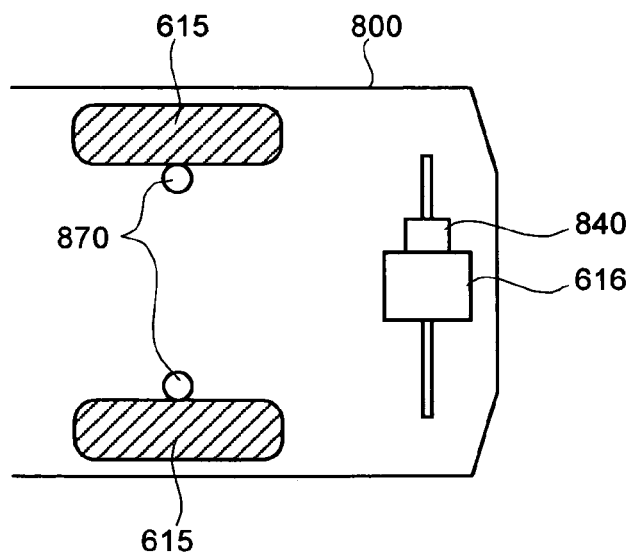
FIG. 7B is a top view of the physical-sound generating unit shown in FIG. 7A.

Next, a second example of the physical-sound generating unit 800 according to the third embodiment, that is, a physical-sound generating unit 800a, will be explained with reference to FIGS. 7A and 7B. In the first example described above, the movable tire 616 is brought into contact with the road surface M according to the control of the elevating mechanism 850 that is actuated according to the drive by the electric motor 830. On the other hand, the second example is characterized in that control of contact and non-contact between the movable tire 616 and the road surface M is performed using a suspension mechanism unit 870 (a suspension system) that adjusts a state of contact between the movable tire 616 and the road surface M.

As shown in the figure, the physical-sound generating unit 800a includes an air suspension control unit 860 for controlling an expansion mechanism according to an air suspension mechanism unit 870. More specifically, it is possible to separate the movable tire 616, which is attached to the bumper 619 of the vehicle 600, from the road surface M (a position of a chain line in FIG. 7A) by increasing a height of the vehicle 600 with the air suspension mechanism unit 870.

On the other hand, it is possible to bring the movable tire 616 into contact with the road surface M by reducing the height of the vehicle 600 with the air suspension mechanism unit 870. In this case, the movable tire 616 comes into contact with the road surface M. It is possible to give a road noise, which is generated by the contact between the movable tire 616 and the road surface M, to a pedestrian as an alarm.

Figure 8A:
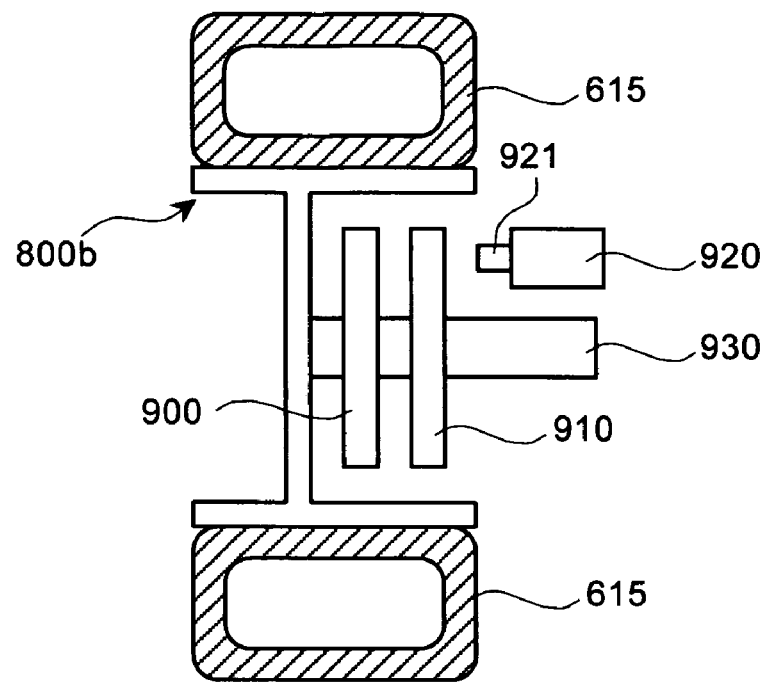
FIG. 8A is a diagram of a structure of the physical-sound generating unit.
Figure 8B:
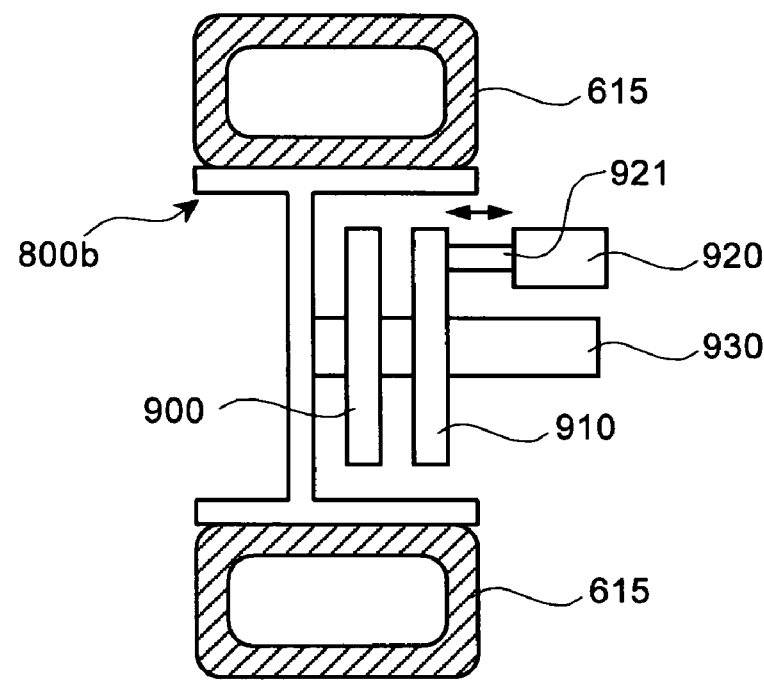
FIG. 8B is an explanatory diagram of a state of actuation by the physical-sound generating unit.
Figure 9:
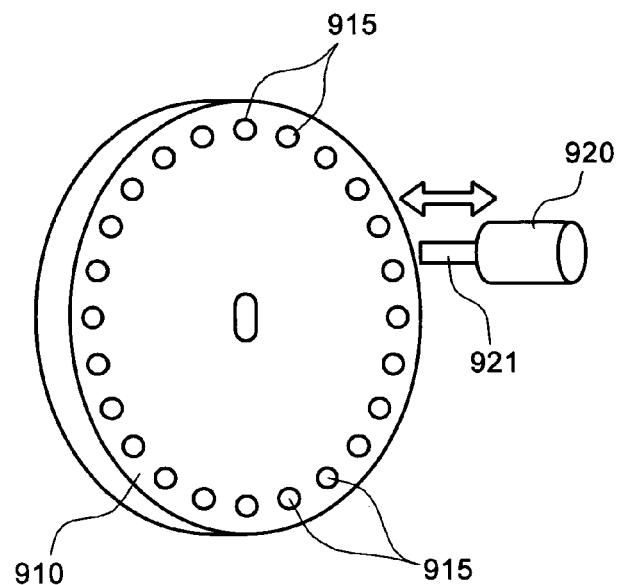
FIG. 9 is an enlarged perspective view of a disk for generating a physical sound.
Figure 10:
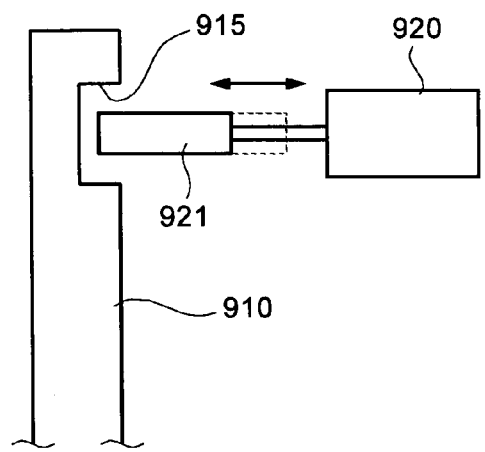
FIG. 10 is an enlarged explanatory diagram of a main part of the disk for generating a physical sound shown in FIG. 9.

Next, a third example of the physical-sound generating unit 800 according to the third embodiment, that is, a physical-sound generating unit 800b, will be explained with reference to FIGS. 8A, 8B, 9, and 10. FIG. 8A is a diagram of the physical-sound generating unit 800b, FIG. 8B is a diagram of an actuation state in which a collision sound is generated by the physical-sound generating unit 800b, FIG. 9 is an enlarged perspective view of a disk for generating a sound, and FIG. 10 is an enlarged view of a main part of FIG. 8B. The physical-sound generating unit 800b according to the third embodiment is characterized in that a movable member 920 for generating a physical sound is brought into collision with a disk 910 for generating a physical sound, whereby a collision sound generated by the collision is used as an alarm sound for a pedestrian.

As shown in FIG. 8A, the physical-sound generating unit 800b includes the disk 910 for generating a physical sound attached coaxially with a shaft 930 of a brake disk 900 and the movable member 920 for generating a physical sound provided near the disk 910 for generating a physical sound. As shown in FIG. 9, plural through-holes 915 are formed in a peripheral direction of the disk 910. As shown in FIG. 10, a lot 921 of the movable member 920 is made insertable into these through-holes 915. Note that a leaf spring member or the like is adopted as the lot 921 to absorb vibration at the time of collision.

In the physical-sound generating unit 800b constituted as described above, usually, as shown in FIG. 8A, the movable member 920 is spaced apart from the disk 910. When it is detected that a pedestrian approaches the vehicle 600, as shown in FIG. 8B, the lot 921 of the movable member 920 projects toward the disk 910. Consequently, a tip of the lot 921 is inserted into the through-hole 915. Since the disk 910 is rotating, a collision sound is generated according to butting of the lot 921 and an edge of the through-hole 915. Thus, it is possible to give the collision sound generated by the butting to the pedestrian as an alarm sound.

Note that the physical-sound generating unit 800, 800a, or 800b described according to the third embodiment is provided in the electric automobile. However, it is also possible that the physical-sound generating unit 800 is provided in the fuel-cell-powered automobile and, when an alarm is given to a pedestrian, the physical-sound generating unit 800 and an operation sound of an engine, an operation sound of a cooling fan, an operation sound of an air compressor, or the like are used together.

In the electric automobile described above, since an inverter for converting a voltage is used in a drive circuit for driving an electric motor, it is possible to use an operation sound emitted by this inverter as an alarm sound. Details of the vehicle presence sound generation principle using an inverter 690 will be explained with reference to FIG. 11.

Figure 11:
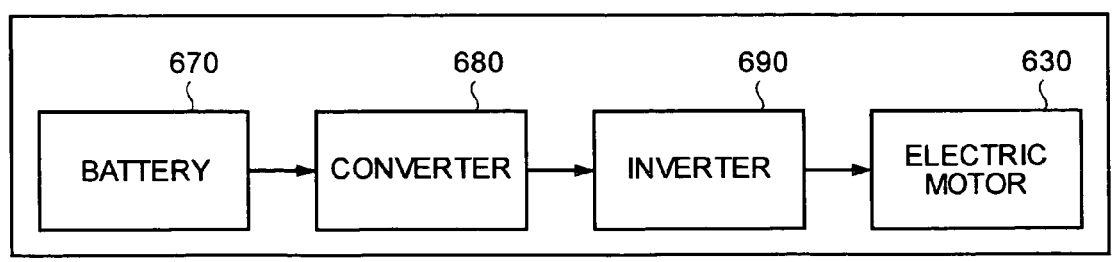
FIG. 11 is a block diagram of an example of a motor drive circuit explaining an operation-sound generation principle in an electric automobile.

FIG. 11 is an example of a drive circuit for driving the electric motor 630. This electric motor drive circuit includes a battery 670, a converter 680, and the inverter 690. The converter 680 has a function of boosting the battery 670 serving as a DC power supply. The inverter 690 has a function of converting a direct current into an alternating current. An AC power supply (three-phase alternating current) with a direct current converted into an alternating current by the inverter 690 is used for driving the electric motor 630.

Usually, a drive frequency of the inverter 690 is adjusted to an acoustic zone level "outside an audible band" that is hard for people to listen to from the viewpoint of silence design. However, in this example, it is possible to use an operation sound according to variation of a drive frequency by the inverter 690 as an alarm sound by setting (changing)

the drive frequency to a drive frequency "within the audible band" that is easy for people to listen to.

In a large bus, a regenerative energy generated at the time of hill descending is converted into thermal energy. More specifically, a resistor and a cooling fan for radiating heat generated by this resistor (cooling the resistor) are set in an upper part of a roof of the bus. Therefore, it is also possible to use an operation sound emitted by the cooling fan for cooling heat from the resistor as an alarm sound.

In the fuel-cell-powered automobile, a fuel cell stack, which is an aggregate (a stacked body) of single cells, is provided. Therefore, it is also possible to use a vibration sound generated by the fuel cell stack at the time of drive of the fuel-cell-powered automobile as an alarm sound.

As the physical-sound generating unit, by changing (reducing or increasing) a tire air pressure of its vehicle, a road noise, which is generated according to the reduction or the increase of the tire air pressure, may be used as a physical sound. In addition, by changing an exterior (a body shape) of the vehicle to a desired shape, a traveling resistance sound, which is generated at the time of traveling of the vehicle, may be used as an alarm sound.

Figure 12:
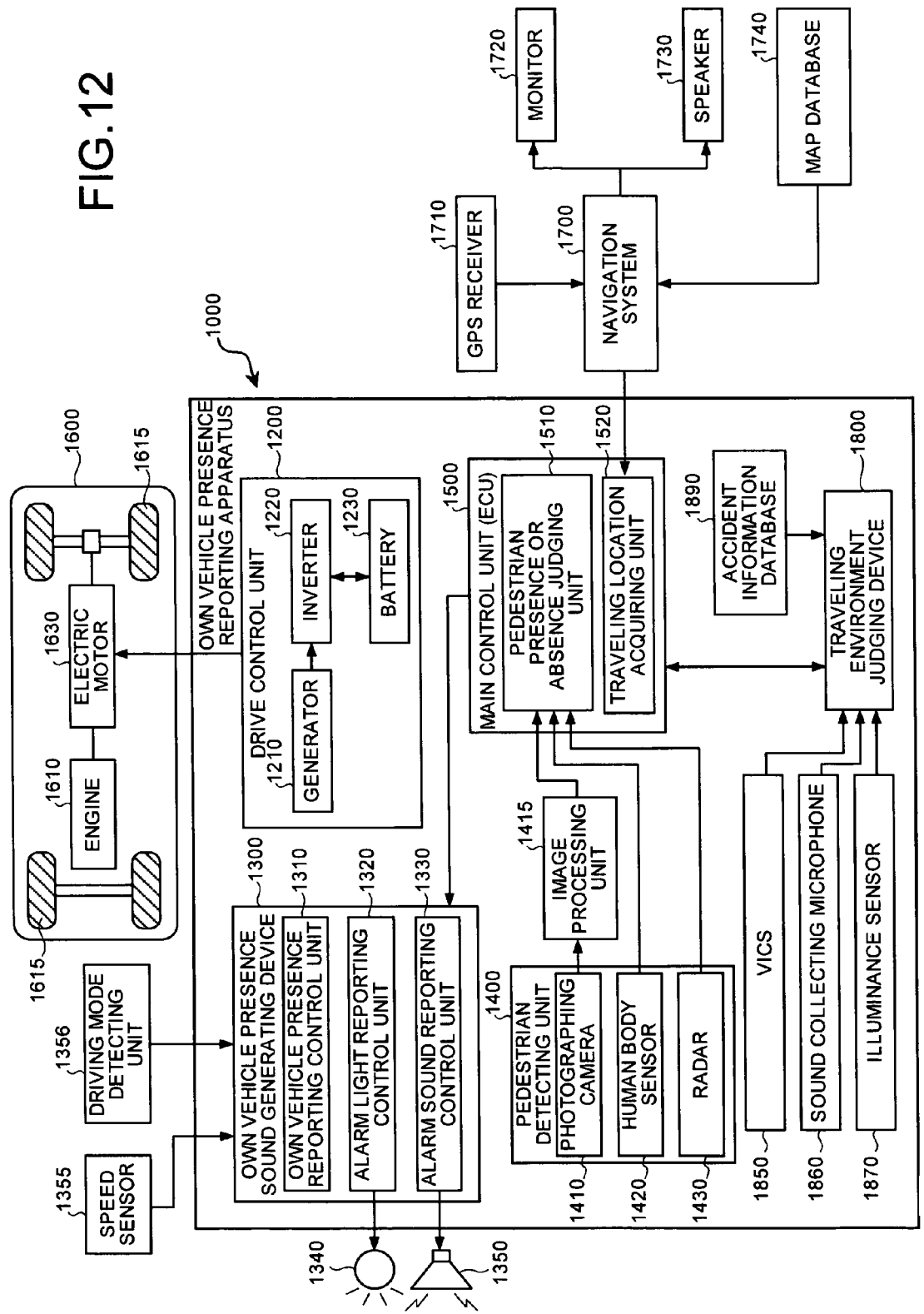
FIG. 12 is a schematic diagram of a vehicle-presence notifying apparatus according to a fourth embodiment of the present invention.
Figure 13:
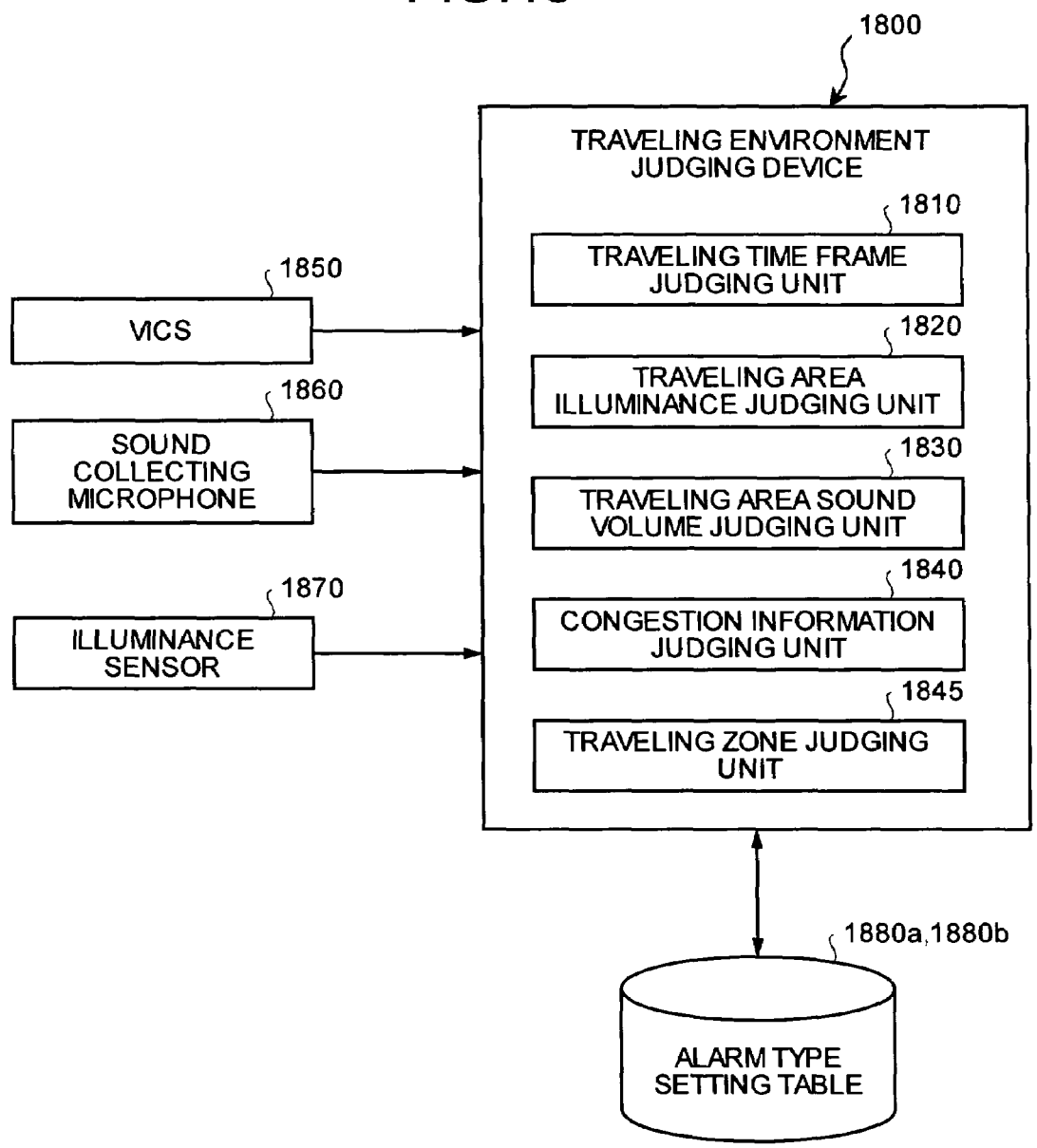
FIG. 13 is a block diagram of an internal structure of a traveling-environment judging unit shown in FIG. 12.

FIG. 12 is a schematic diagram of a vehicle-presence notifying apparatus according to a fourth embodiment of the present invention. FIG. 13 is a block diagram of a traveling-environment judging unit 1800 constituting a main part of the vehicle-presence notifying apparatus according to the fourth embodiment.

Main characteristics of the vehicle-presence notifying apparatus according to the fourth embodiment will be explained as follows. A vehicle-presence notifying apparatus 1000 has a function of judging whether it is necessary to notify presence of its vehicle to people around the vehicle according to a traveling environment thereof. When it is necessary to notify the presence of the vehicle to the people, the vehicle-presence notifying apparatus 1000 selects a combination of notifying units with different notifying forms (e.g., a head light 1340 and a speaker 1350) and performs appropriate notifying to a notifying object like a pedestrian based on the selected combination.

More specifically, the vehicle-presence notifying apparatus 1000 has the following function. When a pedestrian (a notifying object) is detected, the vehicle-presence notifying apparatus 1000 selects an alarm by light (e.g., the headlight 1340) according to an alarm-light-notifying control unit 1320, an alarm by sound (e.g., the speaker 1350) according to an alarm-sound-notifying control unit 1330, or an alarm by both light according to the alarm-light-notifying control unit 1320 and sound according to the alarm-sound-notifying control unit 1330 using a vehicle sound generating unit 1300 according to a traveling environment (a traveling area, a traveling time frame, an illuminance near the traveling area, a sound volume of a vehicle when the vehicle is traveling, etc.) of a vehicle 1600 judged by the traveling-environment judging unit 1800. Then, the vehicle-presence notifying apparatus 1000 gives the selected alarm to the pedestrian.

Consequently, it is possible to notify the presence of the vehicle 1600 to the pedestrian with sound emitted by the speaker 1350 or the like or light emitted by the head light 1340 only when it is necessary according to a traveling environment based on a traveling location of the vehicle 1600. More specifically, even when a pedestrian is detected, when it is judged that it is unnecessary to notify the presence of the vehicle 1600 to the pedestrian with sound or light (or both sound and light), the vehicle-presence notifying apparatus 1000 does not notify the presence of the vehicle 1600 to the pedestrian with sound or light (or both sound and light).

In other words, the vehicle-presence notifying apparatus of the present invention is characterized by notifying presence of its vehicle to a pedestrian only when it is necessary to notify the presence according to a traveling environment and not notifying presence of the vehicle to the pedestrian when it is unnecessary to notify the presence or when it is judged it is useless to notify the presence to the pedestrian. In addition, the vehicle-presence notifying apparatus is characterized by notifying the presence of the vehicle 1600 to the pedestrian with sound emitted by a speaker or the like or light emitted by a headlight (or both sound and light) only when it is necessary to notify the presence according a traveling environment.

Briefly, even when a pedestrian is detected, when it is judged that it is ineffective to notify presence of a vehicle to a pedestrian with sound or light (or both sound and light) because the sound or the light is drawn out by an influence an environment around the vehicle, the vehicle-presence notifying apparatus does not notify the presence of the vehicle to the pedestrian with sound or light (or both sound and light). In the combination of notifying units with different notifying forms (sound emitted by a speaker or the like and light emitted by a headlight), it is also possible that the vehicle-presence notifying apparatus does not notify the presence of the vehicle to the pedestrian.

More specifically, it is effective to notify presence of the vehicle 1600 to a pedestrian or a bicycle rider with sound when a traveling area of the vehicle 1600 is, for example, an area where there is a heavy traffic of pedestrians and bicycles like a city. On the other hand, in an area like a residential area in a suburb, when noise or the like is taken into account, it is not preferable to notify presence of the vehicle 1600 to a pedestrian or a bicycle rider with sound in the same manner as in a city. Thus, in the residential area or the like in the suburb, a notifying method mainly using light is performed as a method of notifying presence of the vehicle 1600 to a pedestrian or the like (a vehicle-presence notifying method).

The vehicle-presence notifying apparatus has the following function. When a pedestrian is detected by a pedestrian detecting unit 1400 and it is judged by a traveling-zone judging unit 1845 that a traveling area of the vehicle 1600 is a city, the vehicle-presence notifying apparatus selects an alarm by the head light 1340 according to the alarm-light-notifying control unit 1320, an alarm by the speaker 1350 according to the alarm-sound-notifying control unit 1330, or an alarm by both the headlight 1340 and the speaker 1350 using the vehicle-presence-sound generating unit 1300 based on an alarm type set by a vehicle-presence-notifying control unit 1310. Then, the vehicle-presence notifying apparatus gives the selected alarm to the pedestrian.

Consequently, as shown in FIG. 12, the vehicle-presence notifying apparatus 100 includes a drive control unit 1200, the vehicle-presence-sound generating unit 1300, the pedestrian detecting unit 1400, a main control unit 1500, and a traveling-environment judging unit 1800.

The drive control unit 1200 includes a generator 1210, an inverter 1220, and a battery 1230 and has a function of mainly controlling drive by the electric motor 1630 mounted on the vehicle 1600. More specifically, the drive by the electric motor 1630 is performed according to the control by the drive control unit 1200 to drive to rotate the tires 1615, whereby the vehicle 1600 can travel.

The vehicle-presence-sound generating unit 1300 includes the vehicle-presence-notifying control unit 1310, the alarm-light-notifying control unit 1320, and the alarm-sound-notifying control unit 1330. The vehicle-presence-notifying control unit 1310 has a function of judging whether it is necessary to notify presence of the vehicle 1600 to people around the vehicle 1600. The alarm-light-notifying control unit 1320 has a function of notifying the presence of the vehicle 1600 to the people with an alarm by light. The head light 1340 can give the alarm by light according to the alarm-light-notifying control unit 1320. The alarm-sound-notifying control unit 1330 has a function of notifying the presence of the vehicle 1600 to the people with an alarm by sound. The speaker 1350 can give the alarm by sound according to the alarm-sound-notifying control unit 1330 using an artificial sound or a voice.

The vehicle-presence-notifying control unit 1310 has the following function. The vehicle-presence-notifying control unit 1310 selects an alarm by the headlight 1340 according to the alarm-light-notifying control unit 1320, an alarm by the speaker 1350 according to the alarm-sound-notifying control unit 1330, or an alarm by both the headlight 1340 and the speaker 1350 according to a traveling environment of the vehicle 1600 judged by the traveling-environment judging unit 1800. Then, the vehicle-presence-notifying control unit 1310 executes control for giving the selected alarm to a pedestrian. More specifically, the vehicle-presence-notifying control unit 1310 has a function of performing predetermined control according to a traveling environment of the vehicle 1600 judged by a traveling-time-frame judging unit 1810 constituting the traveling-environment judging unit 1800, a traveling-area-illuminance judging unit 1820, a traveling-area sound-volume judging unit 1830, and a congestion-information judging unit 1840.

Reference numeral 1356 denotes a driving-mode detecting unit that detects a driving mode. The driving mode indicates a "low noise control mode" like a motor drive mode of a hybrid automobile or a power generation system un-drive mode and a "mode other than the low noise control mode" like an engine drive mode of a hybrid automobile. The vehicle-presence notifying apparatus 100 detects the driving mode using the driving-mode detecting unit 1356 and, even when it is necessary to notify presence of the vehicle 1600 to a pedestrian, does not notify the presence of the vehicle 1600 to the pedestrian if the vehicle 1600 is in the mode other than the low noise control mode.

The pedestrian detecting unit 1400 has a function of detecting a pedestrian (a human body) or a bicycle rider that is present around the vehicle 1600 or approaches the vehicle 1600 and includes a photographing camera 1410, a human-body sensor 1420, and a radar 1430. An image processing unit 1415 has a function of converting analog information (video information) obtained by the photographing camera 1410 into digital information. Note that it is possible to adopt, for example, a pyroelectric infrared-ray sensor with a wide wavelength region, which can detect an infrared ray emitted from a pedestrian (a human body) or a bicycle rider, as the human-body sensor 1410.

The main control unit 1500 has a function of collectively controlling respective components of the entire vehicle-presence notifying apparatus 1000 and includes a pedestrian-presence judging unit 1510 and a traveling-location acquiring unit 1520.

The pedestrian-presence judging unit 1510 has a function of detecting a pedestrian (a human body) or a bicycle rider around the vehicle 1600 or approaches the vehicle 1600, based on a "pedestrian detection ON signal" sent from the photographing camera 1410, the human-body sensor 1420, or the radar 1430. The traveling-location acquiring unit 1520 has a function of acquiring a traveling location of the vehicle 1600. Here, it is possible to perform the acquisition of a traveling location with the traveling-location acquiring unit 1520 using the navigation system 1700.

As shown in FIG. 13, the traveling-environment judging unit 1800 includes the traveling-time-frame judging unit 1810, the traveling-area-illuminance judging unit 1820, the traveling-area sound-volume judging unit 1830, the congestion-information judging unit 1840, and the traveling-zone judging unit 1845. Reference signs 1880a and 1880b indicate alarm-type setting tables in which alarm types according to automobile presence notifying methods corresponding to traveling environments are set (stored). More specifically, reference signs 1880a and 1880b indicate an alarm-type setting table in which alarm types according to a city control mode are set (stored) and an alarm-type setting table in which alarm types according to a suburb control mode are set (stored).

The traveling-time-frame judging unit 1810 has a function of acquiring a traveling time frame of the vehicle 1600 and judging a time of day in a traveling time frame of the vehicle 1600 based on the acquired traveling time frame. The traveling time frame judged by the traveling-time-frame judging unit 1810 is roughly divided into the night and the day. It is possible to perform the acquisition of a time frame with the traveling location acquisition unit 1520 using the navigation system 1700.

The traveling-area-illuminance judging unit 1820 has a function of judging brightness around the vehicle 1600 at the time when the vehicle 1600 is traveling. An illuminance sensor 1870 performs the detection of an illuminance by the traveling-area-illuminance judging unit 1820. The traveling-area sound-volume judging unit 1830 has a function of judging a sound volume outside a vehicle at the time when the vehicle 1600 is traveling. A sound collecting microphone 1860 performs the acquisition of a sound volume outside a vehicle (a volume of sound) in a traveling area of the vehicle 1600 by the traveling-area sound-volume judging unit 1830.

The congestion-information judging unit 1840 has a function of acquiring information on congestion caused by other vehicles near a traveling area of the vehicle 1600 and judging the acquired congestion information. The acquisition and the judgment on the congestion information by the congestion-information judging unit 1840 are performed according to acquisition of congestion information by a vehicle information and communication system (VICS) 1850. The traveling-zone judging unit 1845 has a function of judging whether a traveling zone based on a traveling location of the vehicle 1600 is a city or a suburb or the like rather than a city.

The navigation system 1700 is connected with a GPS receiver 1710 that calculates a present location of the vehicle 1600 according to communication with a GPS satellite, a monitor 1720, and a speaker 1730. The navigation system 1700 has a function of managing a planned route (a planned traveling route) and a present traveling location of the vehicle 1600. In particular, in this embodiment, using the navigation system 1700, the traveling-environment judging unit 1800 judges a time frame at the time when the vehicle 1600 is traveling and whether a traveling area of the vehicle 1600 is a city with the traveling-zone judging unit 1845 according to a present location of the vehicle 1600 calculated by the GPS receiver 1710.

Figure 14:
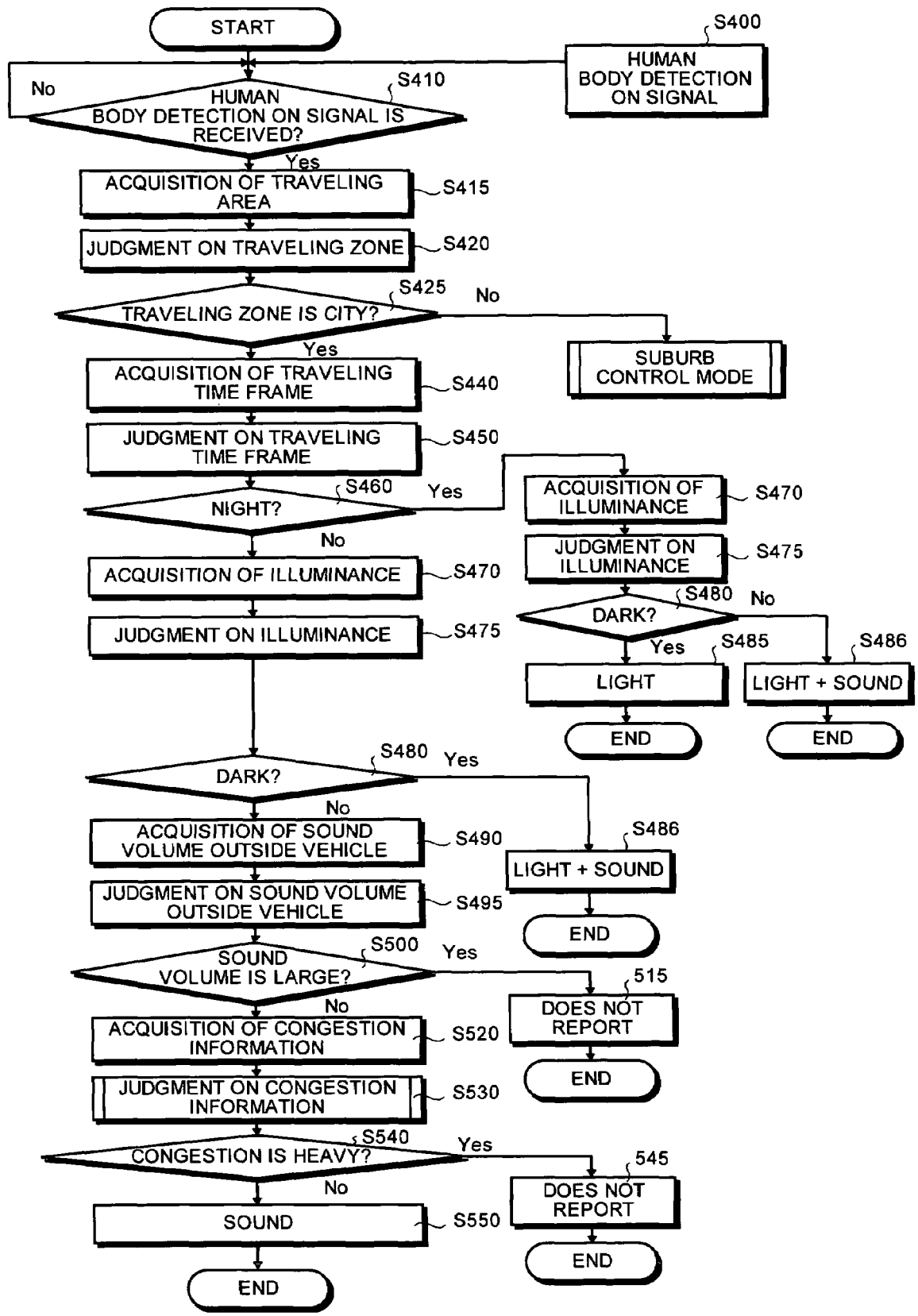
FIG. 14 is a flowchart of basic control procedures according to a vehicle-presence notifying method with a city set as a traveling zone object.

FIG. 14 is a flowchart explaining the vehicle-presence notifying method. FIG. 15 is a diagram of the alarm-type setting table 1880*a* explaining the vehicle-presence notifying method corresponding to a traveling environment. In the alarm-type setting table 1880*a* shown in FIG. 15, a traveling area of the vehicle 1600 is assumed to be a city and alarm types according to the "city control mod" are set (stored). More specifically, in the alarm-type setting table, an alarm by light using the headlight 1340, an alarm by sound using the speaker 1350, and an alarm by a combination of both light and sound are set (assuming that, in a city, there are many notifying objects like pedestrians and there are bright places around the vehicle even at night).

As shown in the flowchart in FIG. 14, first, the human-body sensor 1420 (FIG. 12) detects presence of a pedestrian or a bicycle rider (a notifying object) around the vehicle 1600 or approach of a pedestrian or a bicycle rider to the vehicle 1600 (ON) (step S400). When the main control unit 1500 of the vehicle-presence notifying apparatus 1000 receives a human body detection ON signal from the human-body sensor 1420 (step S410), the main control unit 1500 acquires a traveling area where the vehicle 1600 is traveling (step S415) and judges a traveling zone based on the traveling area acquired at step S415 (step S420). The main control unit 1500 performs the acquisition of a traveling area at step S420 using the traveling-location acquiring unit 1520. The main control unit 1500 judges a traveling zone at the time of traveling of the vehicle 1600 based on the traveling area of the vehicle 1600 acquired by the traveling-location acquiring unit 1520.

The main control unit 1500 performs the judgment on a traveling zone using the traveling-zone judging unit 1845. The judgment on a traveling zone at step S420 is processing for judging whether a traveling zone of the vehicle 1600 is a city or a suburb (e.g., a residential area). More specifically, the main control unit 1500 judges whether the traveling zone is a city (step S425) and, if it is judged at step S425 that the traveling zone is a city (Yes at step S425), acquires a traveling time frame (step S440) and judges the traveling time frame (step S450).

Then, the main control unit 1500 judges whether the traveling time frame is the night based on a result of the judgment on a traveling time frame (step S460). Note that, if it is judged at step S452 that the traveling area is not a city (No at step S425), the main control unit 1500 shifts to a "suburb control mode" in which a traveling zone of the vehicle 1600 is a suburb like a residential area (see the flowchart in FIG. 16). In other words, the judgment on a traveling environment of the vehicle 1600 means, for example, judgment on whether a time frame is the night or the day using a traveling time frame acquired by the traveling-time-frame judging unit 1810 (FIG. 13).

The processing at step S460 is processing for judging whether a time frame at the time of traveling of the vehicle 1600 is the night or the day. If it is judged at step S460 that the traveling time frame of the vehicle 1600 is the night (Yes at step S460), the main control unit 1500 acquires an illuminance (step S470) and judges whether it is dark around the vehicle 1600 based on the illuminance acquired at step S470 (step s480). Then, if it is judged at step S480 that it is dark around the vehicle 1600 (Yes at step S480), the main control unit 1500 performs control for giving an alarm by light to a pedestrian (step S485). On the other hand, if it is judged at step S480 that it is not dark (it is bright) around the vehicle 1600 (No at step S480), the main control unit 1500 performs control for giving an alarm by light and sound to the pedestrian (step S486) and ends the entire processing (END).

When the vehicle 1600 is traveling a city, it is conceivable that, although a traveling time frame is the "night", a traveling area, where the vehicle 1600 is actually traveling, is bright. If the traveling time frame is the "night" but the actual traveling area is bright in this way (No at step S480), it cannot be said that only the alarm by light is very effective. Therefore, in such a case, the main control unit 1500 performs control for giving an alarm by both sound and light to the pedestrian (step S486). On the other hand, if the traveling time frame of the vehicle 1600 is the "night" and a traveling area, where the vehicle 1600 is actually traveling, is dark (Yes at step S480), the alarm by light is more effective than the alarm by sound, the main control unit 1500 gives only the alarm by light to the pedestrian (step S485) and does not give the alarm by sound.

On the other hand, if it is judged at step S460 that the traveling time frame is not the night (No at step S460), the main control unit 1500 performs the following processing procedures. If it is judged that the traveling time frame is not the night, this means that a time frame at the time of traveling of the vehicle 1600 is the day. Therefore, subsequently, the main control unit 1500 acquires an illuminance (step S470), judges the illuminance (step S475), and judges whether it is dark around the vehicle 1600 based on the illuminance judged at step S475 (step S480). If it is judged at step S480 that it is dark around the vehicle 1600 (Yes at step S480), the main control unit 1500 gives an alarm by light and sound to the pedestrian (step S486) and ends the entire processing (END).

In other words, if the traveling time frame of the vehicle 1600 is the "day" (No at step S460) but the actual traveling area of the vehicle 1600 is dark, it cannot be said that only the alarm by sound is very effective. Thus, in this case, the main control unit 1500 gives an alarm by both sound and light to the pedestrian.

On the other hand, if it is judged at step S480 that it is not dark around the vehicle 1600 (No at step S480), the main control unit 1500 shifts to processing for acquiring a sound volume outside the vehicle (step S490). This processing for acquiring a sound volume outside the vehicle is a processing procedure for acquiring a sound volume outside the vehicle in a traveling area, in which the vehicle 1600 is traveling, selecting an alarm type using the vehicle-presence-notifying control unit 1310 according to the acquired sound volume outside the vehicle, and when a pedestrian is detected, giving a most appropriate alarm to the pedestrian. The main control unit 1500 performs the processing for acquiring the sound volume outside the vehicle in the traveling area using the sound collecting microphone 1860, which acquires a sound volume, and the traveling-area sound-volume judging unit 1830 of the traveling-environment judging unit 1800 (FIG. 13).

In the processing for acquiring a sound volume outside the vehicle, the main control unit 1500 acquires a sound volume outside the vehicle using the sound collecting microphone 1860 (step S490), judges a sound volume outside the vehicle based on the acquired sound volume outside the vehicle (step S495), and judges whether the sound volume outside the vehicle is large or small based on a result of the judgment (step S500). When it is judged at step S500 that the sound volume outside the vehicle is large (No at step S500), the main control unit 1500 does not give an alarm to the pedestrian (step S515) and ends the entire processing (END).

On the other hand, if it is judged at step S500 that the sound volume outside the vehicle is not large (is small) (No at step S500), the main control unit 1500 shifts to a processing for acquiring congestion information (step S520).

The main control unit 1500 acquires congestion information (step S520), judges the congestion information (step S530), and judges whether an amount of congestion is heavy (step S540). The main control unit 1500 acquires a congestion state around the vehicle 1600 using the VICS 1850 (FIG. 12).

The main control unit 1500 judges the amount of congestion according to the congestion information acquired by the VICS 1850 using the congestion-information judging unit 1840 (FIG. 2) of the traveling-environment judging unit 1800. Then, if it is judge at step S540 that the amount of congestion is heavy (Yes at step S540), the main control unit 1500 does not give an alarm to the pedestrian (step S545) and ends the entire processing (END). On the other hand, if it is judged at step S540 that the amount of congestion is not large (is small) (Yes at step S540), the main control unit 1500 gives an alarm by sound to the pedestrian (step S550) and ends the entire processing (END).

When the sound volume outside the vehicle is small and the amount of congestion is small according to the traveling environment (the result of the judgment on a sound volume in the traveling area) based on the sound volume outside the vehicle acquired by the sound collecting microphone 1860 and the traveling environment (the result of the judgment on congestion information) based on the congestion information acquired by the VICS 1850, an alarm by sound using the speaker 1350 is more effective than an alarm by sound using the headlight 1340. Thus, an alarm to be given to the pedestrian in this case is the alarm by sound using the speaker 1350. On the contrary, for example, when the sound volume outside the vehicle is large and when the amount of congestion is heavy, an effect of the alarm by sound cannot be expected much because it is difficult for a pedestrian to listen to the alarm. Thus, the alarm by light and sound is not performed.

In the processing procedures shown in FIG. 14, the main control unit 1500 carries out the processing procedures in the order of the processing for acquiring (judging) a traveling time frame, the processing for acquiring (judging) an illuminance, the processing for acquiring (judging) a sound volume outside the vehicle, and the processing for acquiring (judging) congestion information. However, the order of the processing is not limited to this and it is possible to set a priority order according to circumstance.

Figure 16:
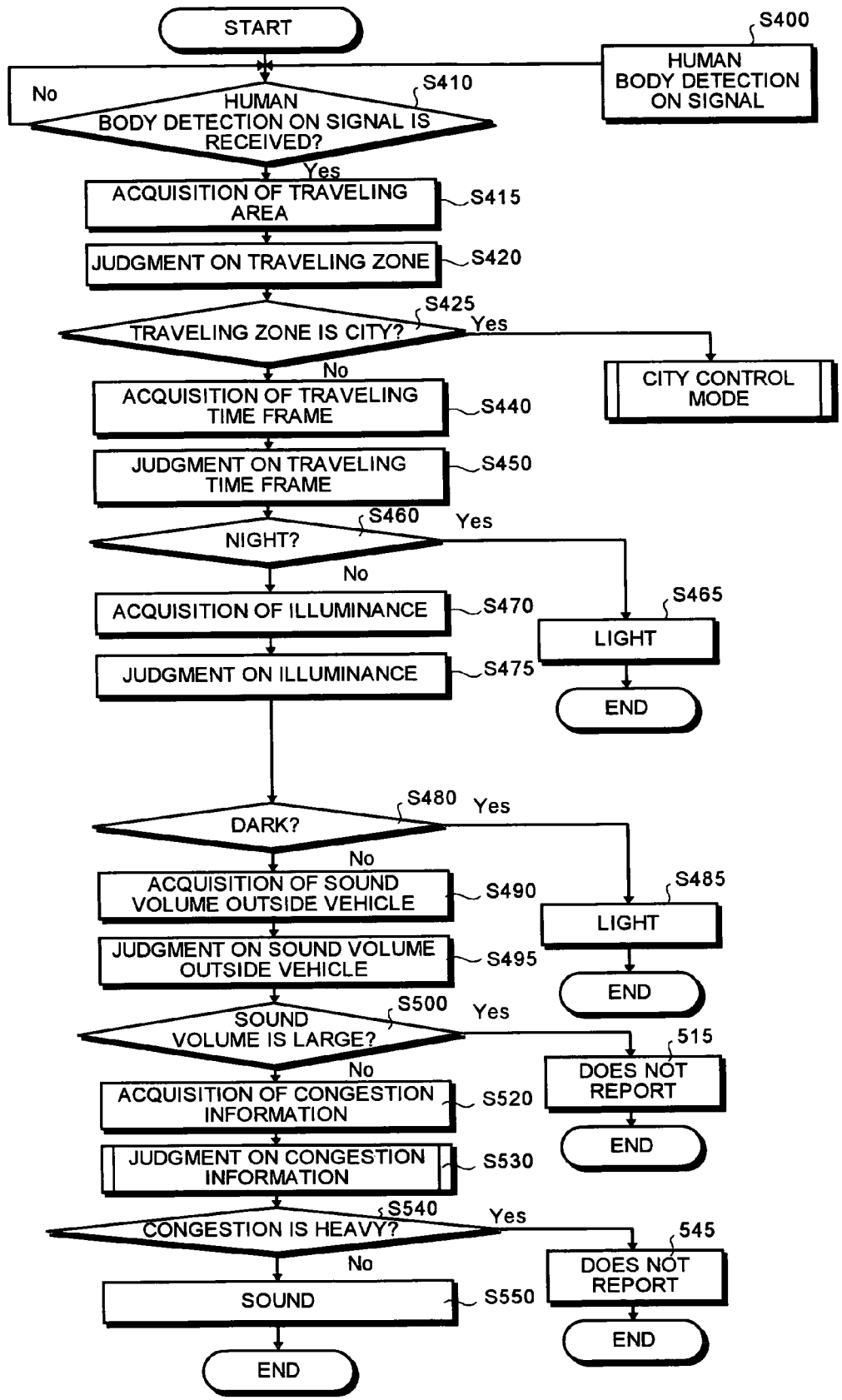
FIG. 16 is a flowchart of basic control procedures according to a vehicle-presence notifying method with a suburb (a residential area) set as a traveling zone object.

FIG. 16 is a flowchart of vehicle presence notifying control according to the vehicle-presence notifying method (the suburb control mode). In the alarm-type setting table 1880*b* in FIG. 17, a traveling zone of the vehicle 1600 is assumed to be a suburb (a residential area). The alarm-type setting table 1880*b* in FIG. 17 indicates a type of an alarm according to the vehicle-presence notifying method corresponding to a detected type of a traveling environment in the suburb control mode. More specifically, the alarm-type setting table 1880*b* indicates a setting of any one of an alarm by light using the headlight 1340 and an alarm by sound using the speaker 1350 or an alarm by a combination of both light and sound (it is assumed that there are few notifying objects like pedestrians in the suburb). Note that, in the flowchart in FIG. 16 in this suburb mode, detailed explanations of processing procedures same as those in the flowchart in FIG. 14 are omitted.

As shown in the flowchart in FIG. 16, first, the human-body sensor 1420 (FIG. 12) detects presence of a pedestrian or a bicycle rider (a notifying object) around the vehicle 1600 or approach of a pedestrian or a bicycle rider to the vehicle 1600 (ON) (step S400). When the vehicle-presence notifying apparatus 1000 receives a human body detection ON signal from the human-body sensor 1420 (step S410), the main control unit 1500 acquires a traveling area where the vehicle 1600 is traveling (step S415) and judges a traveling zone based on the traveling area acquired at step S415 (step S420). Then, the main control unit 1500 judges whether the traveling zone is a city (step S425) and, if it is judged at step S425 that the traveling zone is a city (Yes at step S425), shifts to the "city control mode" in which a traveling zone, where there are many notifying objects like pedestrians, is set as an object (see the flowchart in FIG. 14).

On the other hand, if it is judged at step S425 that the traveling zone is not a city (No at step S425), the main control unit 1500 shifts to the next processing for acquiring a traveling time frame (step S440). The processing for acquiring a traveling time frame is processing for judging a traveling time frame using the traveling-time-frame judging unit 1810 (FIG. 2) (step S450). Then, the main control unit 1500 judges whether the traveling time frame is the night based on a result of the judgment on the traveling time frame (step S460).

As described above, the processing at step S460 is processing for judging whether a time frame at the time of traveling of the vehicle 1600 is the night or the day. If it is judged at step S460 that a traveling time frame of the vehicle 1600 is the night (Yes at step S460), the main control unit 1500 gives an alarm by light to a pedestrian (step S465).

On the other hand, if it is judged at step S460 that the traveling time frame of the vehicle 1600 is not the night (No at step S460), the main control unit 1500 acquires an illuminance (step S470), judges the illuminance (step S475), and judges whether it is dark around the vehicle 1600 based on the illuminance judged at step S475 (step S480).

Then, when it is judged at step S480 that it is dark around the vehicle 1600 (Yes at step S480), the main control unit 1500 gives an alarm by sound to the pedestrian (step S485) and ends the entire processing (END). On the other hand, when it is judged at step S480 that it is not dark (it is bright) around the vehicle 1600 (No at step S480), the main control unit 1500 shifts to processing for acquiring a sound volume outside the vehicle (step S490). Then, the main control unit 1500 performs the same processing procedures as the flowchart in FIG. 14 (steps S490 to S550).

In the flowchart described above, when a traveling area of the vehicle 1600 is a city, the main control unit 1500 judges that a pedestrian (a notifying object) or the like is present around the vehicle 1600. However, it is also possible to detect presence of a pedestrian or the like around the vehicle using a speed sensor provided in the vehicle in a situation other than such a situation in which presence of a pedestrian is judged according to an area (a city or a suburb). In this case, an alarm by sound or light (or both sound and light) is given to the pedestrian or the like. For example, when a speed sensor 1355 (FIG. 12) detects traveling of the vehicle 1600 at high speed (100 km/h), the main control unit 1500 can judge that there is no pedestrian or the like around the vehicle 1600. Thus, when such traveling of the vehicle 1600 at high speed is detected, the main control unit 1500 can judge that there is no pedestrian around the vehicle 1600. On the other hand, for example, when the speed sensor 1355 detects traveling of the vehicle 1600 at low speed (20 km/h), the main control unit 1500 can judge that it is likely that a pedestrian or the like is present around the vehicle 1600. Thus, when such traveling of the vehicle 1600 at low speed is detected, the main control unit 1500 performs control for giving an alarm by sound or light (or both sound and light) to the pedestrian or the like.

It is also possible to use the navigation system 1700 as a reference for detecting presence of a pedestrian or the like around the vehicle 1600. The main control unit 1500 acquires map information around a traveling location of the vehicle 1600 using the navigation system 1700. When a road state of the traveling location of the vehicle 1600 (a traveling road at the present point of the vehicle 1600) is, for example, a "city area", a "narrow road", or an "alley", the main control unit 1500 can judge that it is likely that a pedestrian (a notifying object) or the like is present around the vehicle 1600 based on the acquired map information. Thus, in such a case, the main control unit 1500 performs control for giving an alarm by sound or light (or both sound and light) to the pedestrian.

Note that, even when the road state of the traveling location of the vehicle 1600 is the "city area", the "narrow road", or the "alley", when there is a sidewalk, a guardrail for the sidewalk, or the like, it is assumed less likely that the vehicle 1600 collides with a pedestrian or the like. Thus, in this case, an alarm may not be given to the pedestrian or the like in particular.

It is also possible to use an accident history information database 1890 (FIG. 12) in which accident history information of records of car accidents in the past is stored. The main control unit 1500 can judge that it is likely that a pedestrian (a notifying object) or the like is present in a road or the like where accidents occurred frequently. Therefore, when the vehicle 1600 is traveling on a road recorded in the accident history, the main control unit 1500 performs control for giving an alarm by sound or light (or both sound and light) based on the accident history in the past. Note that the main control unit 1500 can acquire the accident history information of records of car accidents in the past from the outside using a communication unit provided in the vehicle 1600.

It is also possible to use the photographing camera 1410 in the pedestrian detecting unit 1400 for detecting a pedestrian. The main control unit 1500 may judge whether a pedestrian is walking to the vehicle 1600 using the photographing camera 1410 to thereby perform control for giving an alarm by sound and light (or both sound and light) to the pedestrian only when it is judged that the pedestrian is walking to the vehicle 1600.

This is because, when a pedestrian is walking in a direction separating from the vehicle 1600, since there is no likelihood of collision between the vehicle 1600 and the pedestrian, it is considered unnecessary to give an alarm to the pedestrian. On the contrary, the main control unit 1500 may perform control for, when it is judged that a pedestrian is moving away in the direction separating from the vehicle 1600, giving an alarm to the pedestrian and, when it is judged that a pedestrian approaches the vehicle 1600, not giving an alarm to the pedestrian. This is because, when a pedestrian looks to a direction in which the vehicle 1600 is present, it is assumed that the pedestrian recognizes the presence of the vehicle 1600.

It is also possible to use an operation or a driving operation that is performed when a driver of the vehicle 1600 visually recognizes a pedestrian (a notifying object). For example, when the driver of the vehicle 1600 visually recognizes a pedestrian walking in front of the vehicle 1600, the driver reduces a traveling speed or performs a braking operation or the like. Therefore, the main control unit 1500 can judge that the pedestrian is present around the vehicle 1600 based on the operation or the driving operation that the driver performs when the driver visually recognizes the pedestrian. In this case, the main control unit 1500 performs control for giving an alarm by sound or light (or both sound and light) to the pedestrian.

As described above, according to the fourth embodiment, the vehicle-presence notifying apparatus 1000 selects an alarm by the headlight 1340 according to the alarm-light-notifying control unit 1320 constituting the vehicle-presence-sound generating unit 1300 or an alarm by the speaker 1350 according to the alarm-sound-notifying control unit 1330 constituting the vehicle-presence-sound generating unit 1300 (or an alarm by the headlight 1340 and the speaker 1350) according to a traveling environment of the vehicle 1600 judged by the traveling-environment judging unit 1800. When it is judged that an alarm is necessary, the vehicle-presence notifying apparatus 1000 gives the alarm by the headlight 1340 or the alarm by the speaker 1350 (or the alarm by both the headlight 1340 and the speaker 1350) to the pedestrian appropriately. Thus, it is possible to given an alarm according to a most appropriate alarm type according to a traveling environment of the vehicle 1600 and secure safety for the pedestrian surely.

According to the present invention, there is an effect that it is unnecessary to provide a sound source or the like for generating an alarm sound and, in addition, it is possible to effectively utilize an operation sound generated by existing equipment originally provided in the vehicle to generate an alarm sound easily.

Furthermore, according to the present invention, there is an effect that it is unnecessary to provide a sound source or the like for generating an alarm sound anew and, in addition, it is possible to effectively utilize an operation sound (an engine sound) emitted by the existing engine originally provided in a hybrid automobile or the like to generate an alarm sound. In addition, there is an effect that it is possible to effectively utilize the engine as a generator, whereby it is possible to generate electricity to be used in an electric motor.

Moreover, according to the present invention, there is an effect that it is unnecessary to provide a sound source or the like for generating an alarm sound anew and, in addition, it is possible to effectively utilize an operation source generated by the existing compressor originally provided in a hybrid automobile or the like to generate an alarm sound.

Furthermore, according to the present invention, there is an effect that it is unnecessary to provide a sound source or the like for generating an alarm sound anew and, in addition, it is possible to effectively utilize a drive frequency sound generated by the existing inverter for an electric motor originally provided in an electric automobile or the like to generate an alarm sound.

Moreover, according to the present invention, there is an effect that it is possible to maintain a necessary minimum silence characteristic originally provided in a hybrid automobile or the like.

Furthermore, according to the present invention, there is an effect that it is possible to perform appropriate notifying for a pedestrian based on a traveling environment of the vehicle and, in addition, it is possible to maintain a necessary minimum silence characteristic.

Moreover, according to the present invention, there is an effect that it is possible to utilize the physical sound generating unit effectively to generate an alarm sound for a notifying object (e.g., a pedestrian) easily.

Furthermore, according to the present invention, there is an effect that it is possible to utilize existing tires effectively to thereby give an alarm to a notifying object (e.g., a pedestrian) easily.

Moreover, according to the present invention, there is an effect that it is possible to simply change a shape of a body (a vehicle body) originally provided in a vehicle to thereby utilize a shape of the existing vehicle effectively to generate an alarm sound.

Furthermore, according to the present invention, there is an effect that, when the tire for generating a physical sound and a road surface are in contact with each other, it is possible to generate a road noise and give an alarm to a notifying object (e.g., a pedestrian) surely with this road noise.

Moreover, according to the present invention, there is an effect that, when the tire for generating a physical sound and a road surface are in contact with each other, it is possible to generate a road noise easily with the grooves formed in the tire for generating a physical sound.

Furthermore, according to the present invention, there is an effect that it is possible to effectively utilize the existing suspension mechanism to bring the tire for generating a physical sound and a road surface into contact with each other to thereby give an alarm to a notifying object (e.g., a pedestrian) easily.

Moreover, according to the present invention, there is an effect that it is possible to give an alarm to a notifying object (e.g., a pedestrian) surely with sound of collision between the disk for generating a physical sound and the movable lot member.

Furthermore, according to the present invention, there is an effect that it is possible to perform appropriate notifying for, for example, a pedestrian (or a bicycle rider) based on a traveling environment of the vehicle and, in addition, maintains a necessary minimum silence characteristic.

Moreover, according to the present invention, in an environment in which notifying by light is more effective than notifying by sound, since the notifying by light is selected to control notifying, there is an effect that it is possible to perform notifying according to a traveling environment surely. Moreover, since the notifying by sound is given rather than the notifying by light based on judgment on a traveling area according to a traveling environment of the vehicle even in a suburb, there is an effect that it is possible to perform appropriate notifying more suitable for the environment.

Furthermore, according to the present invention, there is an effect that it is possible to give an alarm to a pedestrian (a notifying object) surely according to combination of appropriate notifying units.

Moreover, according to the present invention, there is an effect that it is possible to notify presence of the vehicle to a notifying object surely with the notifying units using sound and light.

Furthermore, according to the present invention, there is an effect that it is possible to given an alarm to a pedestrian based on an appropriate alarm type according to a traveling time frame of the vehicle.

Moreover, according to the present invention, there is an effect that it is possible to give an alarm to a pedestrian based on an appropriate alarm type according to brightness around the vehicle at the time when the vehicle travels.

Furthermore, according to the present invention, there is an effect that it is possible to give an alarm to a pedestrian based on an appropriate alarm type according to a sound volume outside the vehicle at the time when the vehicle is traveling.

Moreover, according to the present invention, there is an effect that it is possible to given an alarm to a pedestrian based on an appropriate alarm type according to a state of congestion in a traveling area of the vehicle.

Furthermore, according to the present invention, there is an effect that it is possible to give an alarm to a pedestrian according to an appropriate alarm type based on the judging unit that is selected preferentially.

Moreover, according to the present invention, there is an effect that it is possible to secure safety for a pedestrian (a notifying object) surely.

Furthermore, according to the present invention, there is an effect that it is possible to give an alarm to a pedestrian (a notifying object) at appropriate timing according to a road on which the vehicle is planned to travel (map information) and a road on the vehicle is traveling.

Since it is judged whether a traveling location of the vehicle is in a city based on a traveling location (map information) of the vehicle searched by the map-information acquiring unit, there is an effect that it is possible to given an alarm to a pedestrian based on an appropriate alarm type. When a traveling location of the vehicle is in an area other than a city (the suburb, etc.), generation of a sound by the vehicle-presence-sound generating unit is kept to a necessary minimum, there is an effect that it is possible to maintain a silence characteristic. In addition, since notifying by sound is also performed in the suburb or the like as required, there is an effect that it is possible to perform notifying based on a most appropriate alarm type.

Moreover, according to the present invention, there is an effect that it is possible to judge possibility of presence of a pedestrian (a notifying object) around the vehicle accurately based on accurate history information according to accident history information in the past.

Furthermore, according to the present invention, there is an effect that it is possible to judge (recognize) presence of a pedestrian (a notifying object) around the vehicle accurately based on traveling speed of the vehicle detected by the vehicle speed detecting unit.

Moreover, according to the present invention, there is an effect that it is possible to give an alarm to a pedestrian (a notifying object) based on an appropriate alarm type according to a mode of driving by the vehicle.

Furthermore, according to the present invention, an alarm by sound is kept to a necessary minimum in a residential area or the like in the suburb where there is only a little traffic of pedestrians and only a small number of people live. Thus, there is an effect that it is possible to realize a vehicle-presence notifying method that can secure safety for a pedestrian surely while maintaining a silence characteristic originally provided in a hybrid automobile or the like.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for notifying presence of a vehicle to a periphery of the vehicle, the apparatus comprising:
a control unit that controls an operating unit that operates to cause the vehicle to drive, the operating unit generating an operation sound;

a judging unit that judges whether it is necessary to notify the presence of the vehicle to the periphery of the vehicle; and a notifying unit that notifies, when the judging unit judges that it is necessary to notify the presence of the vehicle to the periphery of the vehicle, the presence of the vehicle to the periphery of the vehicle using the operation sound, by changing a content of a control by the control unit.

2. The apparatus according to claim 1, wherein
the control unit controls an operation of an engine, and
the notifying unit notifies the presence of the vehicle to the periphery of the vehicle using an operation sound of the engine.

3. The apparatus according to claim 1, wherein
the control unit controls an operation of a compressor, and
the notifying unit notifies the presence of the vehicle to the periphery of the vehicle using an operation sound of the compressor.

4. The apparatus according to claim 1, wherein
the control unit has a function of changing a drive frequency of an inverter constituting a motor drive circuit, and
the notifying unit notifies the presence of the vehicle to the periphery of the vehicle using the drive frequency of the inverter.

5. The apparatus according to claim 1, further comprising an object detecting unit that detects an object around the vehicle, wherein
when the object detecting unit detects the object, the judging unit judges that it is necessary to notify the presence of the vehicle to the periphery of the vehicle.

6. The apparatus according to claim 1, further comprising a traveling-environment acquiring unit that acquires a traveling environment of the vehicle, wherein
the judging unit judges whether it is necessary to notify the presence of the vehicle to the periphery of the vehicle based on the traveling environment acquired.

7. An apparatus for notifying presence of a vehicle to a periphery of the vehicle, the apparatus comprising:
a physical sound generating unit that generates a physical sound by driving of the vehicle;
a judging unit that judges whether it is necessary to notify the presence of the vehicle to the periphery of the vehicle; and
a notifying unit that notifies, when the judging unit judges that it is necessary to notify the presence of the vehicle to the periphery of the vehicle, the presence of the vehicle to the periphery of the vehicle, by causing the physical sound generating unit to generate the physical sound.

8. The apparatus according to claim 7, wherein the physical sound generating unit generates a road noise as the physical sound by changing an air pressure of a tire of the vehicle.

9. The apparatus according to claim 7, wherein the physical sound generating unit generates a driving-friction sound according to a change of a body shape of the vehicle as the physical sound.

10. The apparatus according to claim 7, wherein the physical sound generating unit includes
an elevating mechanism that moves up and down between a body of the vehicle and a road surface; and
a sound-making tire for generating a physical sound that is brought into contact with the road surface according to up and down of the elevating mechanism.

11. The apparatus according to claim 10, wherein the sound-making tire includes a plurality of grooves.

12. The apparatus according to claim 7, wherein the physical sound generating unit includes
a suspension mechanism that is capable of expanding and contracting between a body and a road surface by a suspension provided in the vehicle; and
a sound-making tire for generating a physical sound that is brought into contact with the road surface by expansion and contraction of the suspension mechanism.

13. The apparatus according to claim 7, wherein the physical sound generating unit includes
a brake disk that brakes the vehicle;
a disk for generating a physical sound that rotates in association with the brake disk; and
a movable lot member that generates a collision sound by collision with the disk for generating a physical sound.

14. The apparatus according to claim 7, further comprising an object detecting unit that detects an object around the vehicle, wherein
when the object detecting unit detects the object, the judging unit judges that it is necessary to notify the presence of the vehicle to the periphery of the vehicle.

15. The apparatus according to claim 7, further comprising a traveling-environment acquiring unit that acquires a traveling environment of the vehicle, wherein
the judging unit judges whether it is necessary to notify the presence of the vehicle to the periphery of the vehicle based on the traveling environment acquired.

16. An apparatus for notifying presence of a vehicle to a periphery of the vehicle, the apparatus comprising:
a traveling-environment judging unit that judges a traveling environment of the vehicle;
a map-information acquiring unit that acquires map information around the vehicle;
a judging unit that judges whether it is necessary to notify the presence of the vehicle to the periphery of the vehicle;
a plurality of notifying units having different notifying mechanisms; and
a selecting unit that selects a combination of the notifying units based on the traveling environment judged, wherein
the judging unit judges whether it is necessary to notify the presence of the vehicle to the periphery of the vehicle, based on the map information acquired; and
when the judging unit judges that it is necessary to notify the presence of the vehicle to the periphery of the vehicle, the vehicle-presence notifying apparatus controls the notifying units based on the combination selected.

17. The apparatus according to claim 16, wherein the notifying units include
a sound notifying unit that notifies the presence of the vehicle with a sound; and
a light notifying unit that notifies the presence of the vehicle with a light.

18. The apparatus according to claim 16, wherein
the traveling-environment judging unit includes a time-frame judging unit that judges a present time frame, and
the selecting unit selects the combination of the notifying units based on the time frame judged.

19. The apparatus according to claim 16, wherein
the traveling-environment judging unit includes an illuminance judging unit that judges brightness around the vehicle, and the selecting unit selects the combination of the notifying units based on the brightness around the vehicle judged.

20. The apparatus according to claim 16, wherein
the traveling-environment judging unit includes a outside-sound judging unit that judges a volume of a sound outside the vehicle, and
the selecting unit selects the combination of the notifying units based on the volume of the sound judged.

21. The apparatus according to claim 16, wherein
the traveling-environment judging unit includes a traffic-condition judging unit that judges a traffic condition around the vehicle, and
the selecting unit selects the combination of the notifying units based on the traffic condition judged.

22. The apparatus according to claim 21, wherein the traveling-environment judging unit includes a priority control unit that executes one of the time-frame judging unit, the illuminance judging unit, the outside-sound judging unit, and the traffic-condition judging unit on a priority base.

23. The apparatus according to claim 16, further comprising an object detecting unit that detects an object around the vehicle, wherein
the judging unit judges whether it is necessary to notify the presence of the vehicle to the periphery of the vehicle, based on the object detected.

24. The apparatus according to claim 16, further comprising:
a traveling-location detecting unit that detects a traveling location of the vehicle; and
an accident-history-information acquiring unit that acquires accident history information including at least information on a location where an accident has occurred before, wherein
the judging unit judges whether it is necessary to notify the presence of the vehicle to the periphery of the vehicle, based on the traveling location of the vehicle detected and the accident history information acquired.

25. The apparatus according to claim 16, further comprising a speed detecting unit that detects a driving speed of the vehicle, wherein
the judging unit judges whether it is necessary to notify the presence of the vehicle to the periphery of the vehicle, based on the driving speed detected.

26. The apparatus according to claim 16, further comprising a driving-mode detecting unit that detects a driving mode of the vehicle, wherein
the judging unit judges whether it is necessary to notify the presence of the vehicle to the periphery of the vehicle, based on the driving mode detected.

27. A method notifying presence of a vehicle to a periphery of the vehicle, the method comprising:
judging a traveling environment of the vehicle;
acquiring map information around the vehicle;
judging whether it is necessary to notify the presence of the vehicle to the periphery of the vehicle, based on the map information acquired;
selecting a combination of notifying units having different notifying mechanisms based on the traveling environment judged; and
controlling the notifying units based on the combination selected when it is judged that it is necessary to notify the presence of the vehicle to the periphery of the vehicle.

* * * * *